(12) United States Patent
Osada

(10) Patent No.: US 11,561,117 B2
(45) Date of Patent: Jan. 24, 2023

(54) ABSOLUTE ENCODER FOR DETECTING ROTATION ANGLE

(71) Applicant: MINEBEA MITSUMI Inc., Nagano (JP)

(72) Inventor: Yasuo Osada, Saitama (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 17/295,201

(22) PCT Filed: Nov. 21, 2019

(86) PCT No.: PCT/JP2019/045610
§ 371 (c)(1),
(2) Date: May 19, 2021

(87) PCT Pub. No.: WO2020/110901
PCT Pub. Date: Jun. 4, 2020

(65) Prior Publication Data
US 2022/0018690 A1    Jan. 20, 2022

(30) Foreign Application Priority Data

Nov. 30, 2018    (JP) .............................. JP2018-225877

(51) Int. Cl.
*G01D 5/245*    (2006.01)
(52) U.S. Cl.
CPC .................................... *G01D 5/245* (2013.01)
(58) Field of Classification Search
CPC ............. G01D 5/12–2525; G01D 2205/20–28
See application file for complete search history.

(56) References Cited

U.S. PATENT DOCUMENTS

| 6,507,188 B1 * | 1/2003 | Dilger ..................... B62D 15/02 |
| | | 324/207.21 |
| 6,687,647 B2 * | 2/2004 | Okumura ................. G01D 5/04 |
| | | 324/207.2 |

(Continued)

FOREIGN PATENT DOCUMENTS

| CN | 103780015 | 5/2014 |
| CN | 104426293 | 3/2015 |

(Continued)

OTHER PUBLICATIONS

International Search Report for PCT/JP2019/045610 dated Jan. 7, 2020.

(Continued)

*Primary Examiner* — Huy Q Phan
*Assistant Examiner* — David B Frederiksen
(74) *Attorney, Agent, or Firm* — IPUSA. PLLC

(57) ABSTRACT

An absolute encoder includes a first drive gear (worm gear 1*d*) configured to rotate in accordance with rotation of a main spindle, and a first driven gear (worm wheel 2*a*) that engages with the first drive gear. The absolute encoder includes a second drive gear (worm gear 2*b*) provided coaxially with the first driven gear and configured to rotate in accordance with rotation of the first driven gear, and a second driven gear provided, in a plan view, on a side opposite the first drive gear with respect to the first driven gear and the second drive gear, the second driven gear engaging with the second drive gear. The absolute encoder includes an angular sensor configured to detect a rotation angle of a rotating body that is rotated in accordance with rotation of the second driven gear.

10 Claims, 21 Drawing Sheets

(56) References Cited

U.S. PATENT DOCUMENTS

| | | | |
|---|---|---|---|
| 7,017,274 B2 | 3/2006 | Stobbe | |
| 2007/0210539 A1* | 9/2007 | Hakui | B60G 15/063 |
| | | | 280/124.147 |
| 2007/0252590 A1* | 11/2007 | Kondo | G01D 5/145 |
| | | | 324/207.25 |
| 2008/0202853 A1* | 8/2008 | Ogami | F16H 59/70 |
| | | | 184/6.12 |
| 2008/0307873 A1* | 12/2008 | Kang | G01D 5/145 |
| | | | 73/117.02 |
| 2011/0115481 A1* | 5/2011 | Katou | G01D 5/04 |
| | | | 324/207.25 |
| 2011/0247440 A1 | 10/2011 | Warke | |
| 2018/0328477 A1* | 11/2018 | Spanedda | F16H 1/16 |
| 2019/0277668 A1 | 9/2019 | Osada | |

FOREIGN PATENT DOCUMENTS

| | | |
|---|---|---|
| JP | H04-096019 U | 8/1992 |
| JP | H09-291982 | 11/1997 |
| JP | 2004-077483 | 3/2004 |
| JP | 2013-002571 | 1/2013 |
| JP | 2018-087774 | 6/2018 |
| TW | 200902971 | 1/2009 |
| TW | 201510494 | 3/2015 |

OTHER PUBLICATIONS

Office Action dated Jun. 27, 2022 with respect to the corresponding Taiwanese patent application No. 108143080.
Office Action dated Oct. 28, 2022 with respect to the corresponding Chinese patent application No. 201980078235.3.

\* cited by examiner

US 11,561,117 B2

ABSOLUTE ENCODER FOR DETECTING ROTATION ANGLE

TECHNICAL FIELD

The present invention relates to an absolute encoder.

BACKGROUND

Conventionally, for various control machine devices, rotary encoders are known to be used to detect locations or angles of movable elements. Such encoders include incremental encoders for detecting relative positions or angles and absolute encoders for detecting absolute positions or angles. For example, Patent document 1 describes an absolute rotary encoder for digitally measuring, as an absolute amount, a rotation amount of a rotation axis for movement control, or a rotation amount of a rotation axis for power transmission, where the rotation axis for movement control is used in a given device such as an automatic controller or a robotic device, and the rotation axis for power transmission is used for opening and closing a valve provided in the given device.

CITATION LIST

Patent Document

[Patent document 1] Japanese Unexamined Utility Application Publication No. H4-96019

SUMMARY

The absolute encoder described in Patent document 1 is configured by stacking, in the axial direction (height direction) of a shaft, components such as a rotating disk, a slit, a light emitting element, and a light receiving element. In this case, in the absolute encoder described in Patent document 1, an axial dimension from multiple components to be stacked in an axial direction is measured in total, and thus the axial dimension of the absolute encoder is increased. Therefore, it is difficult to reduce the axial dimension of the absolute encoder. In other words, there is a difficult problem in achieving a thinner absolute encoder. In order to make the absolute encoder thinner, each of the multiple components is considered to be formed thinly. However, if each of the components becomes thinner, strength of each component is reduced and consequently the component may be likely to be damaged when receiving vibrations or impacts.

Also, when the axial dimension of the absolute encoder is reduced, and dimensions in directions perpendicular to the axial direction of the absolute encoder are reduced, a problem such as reduced strength of each component may arise, as in the case where the axial dimension is reduced. Therefore, in the technique described in Patent document 1, it is difficult to reduce the axial dimension of the absolute encoder and to reduce the dimensions of the absolute encoder with respect to the directions perpendicular to the axial direction.

In light of the point described above, an object of the present invention is to provide an absolute encoder suitable for reducing the size of the absolute encoder.

An absolute encoder according to one or more embodiments of the present invention includes a first drive gear configured to rotate in accordance with rotation of a main spindle, and a first driven gear that engages with the first drive gear. The absolute encoder includes a second drive gear provided coaxially with the first driven gear and configured to rotate in accordance with rotation of the first driven gear, and a second driven gear provided, in a plan view, on a side opposite the first drive gear with respect to the first driven gear and the second drive gear, the second driven gear engaging with the second drive gear. The absolute encoder includes an angular sensor configured to detect a rotation angle of a rotating body that is rotated in accordance with rotation of the second driven gear.

Effects of the Invention

An absolute encoder according to the present invention can provide the effect of reducing the size of the absolute encoder.

DESCRIPTION OF EMBODIMENTS

Figure 1:
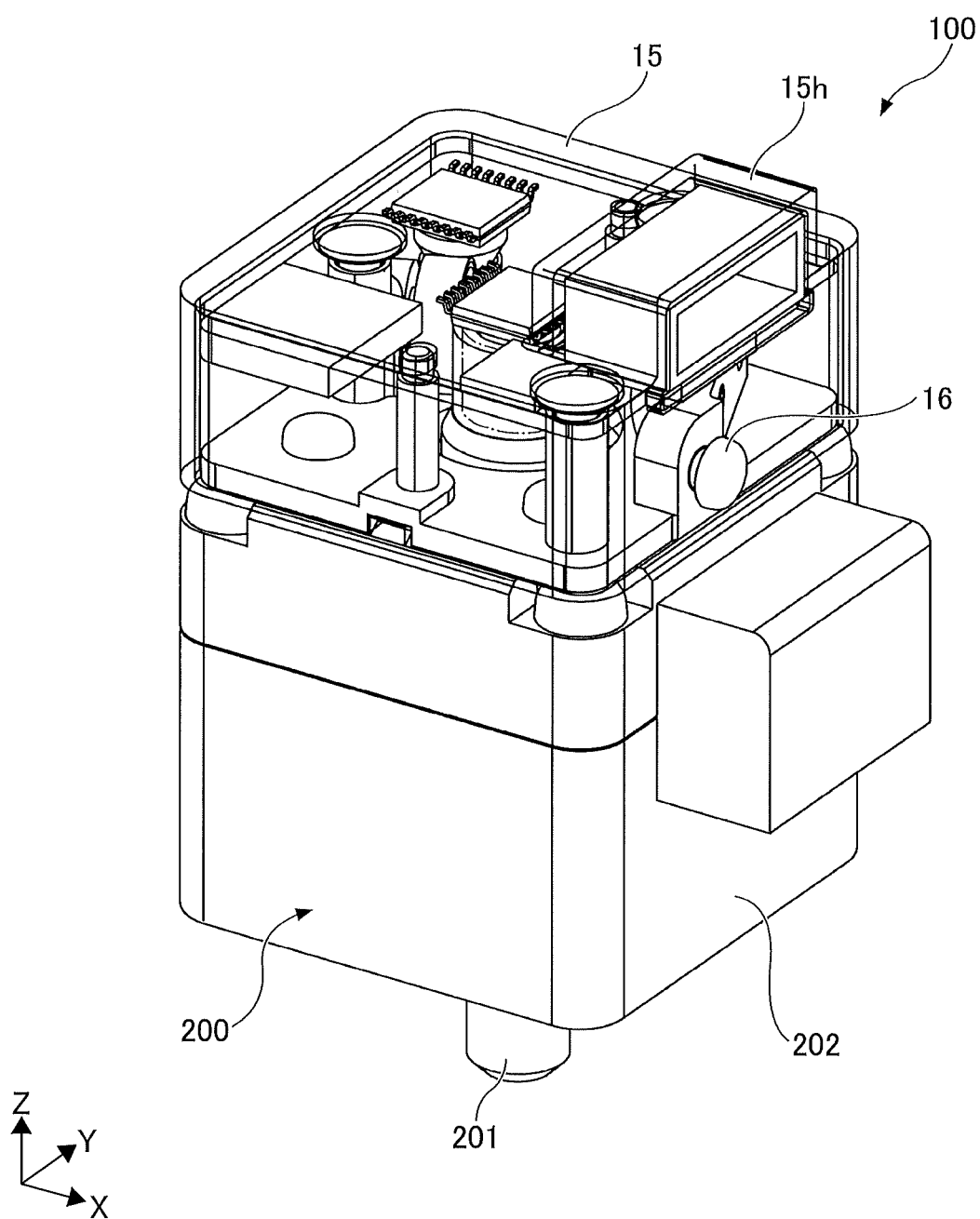
FIG. 1 is a perspective view of an absolute encoder 100 attached to a motor 200 according to an embodiment of the present invention.

An absolute encoder according to an embodiment of the present invention will be described in detail below with reference to the drawings. Note that the present invention is not limited to the embodiment. Note that the tooth shape is omitted in the drawings.

Embodiment

FIG. 1 is a perspective view of an absolute encoder 100 attached to a motor 200 according to the embodiment of the present invention. In FIG. 1, components provided inside a case 15 of the absolute encoder 100 are illustrated transparently. In the description in FIG. 1, in an XYZ coordinate system, a positive Z-axis direction is referred to as an upward direction, and a negative Z-axis direction is referred to as a downward direction. However, the positive Z-axis direction and the negative Z-axis direction do not mean a universal vertical direction. The Z-axis direction corresponds to a direction in which a main spindle described below extends. For example, the X-axis direction corresponds to an alignment direction of a substrate positioning pin 10j and a pillar 10m described below, in directions perpendicular to the Z-axis direction. The Y-axis direction corresponds to a direction perpendicular to both the Z-axis direction and the X-axis direction. The representation and definition for the axis directions described above are also applied in the figures after FIG. 1. Note that in the present embodiment, a view of the absolute encoder 100 taken along the Z-axis is referred to as a plan view.

Figure 2:
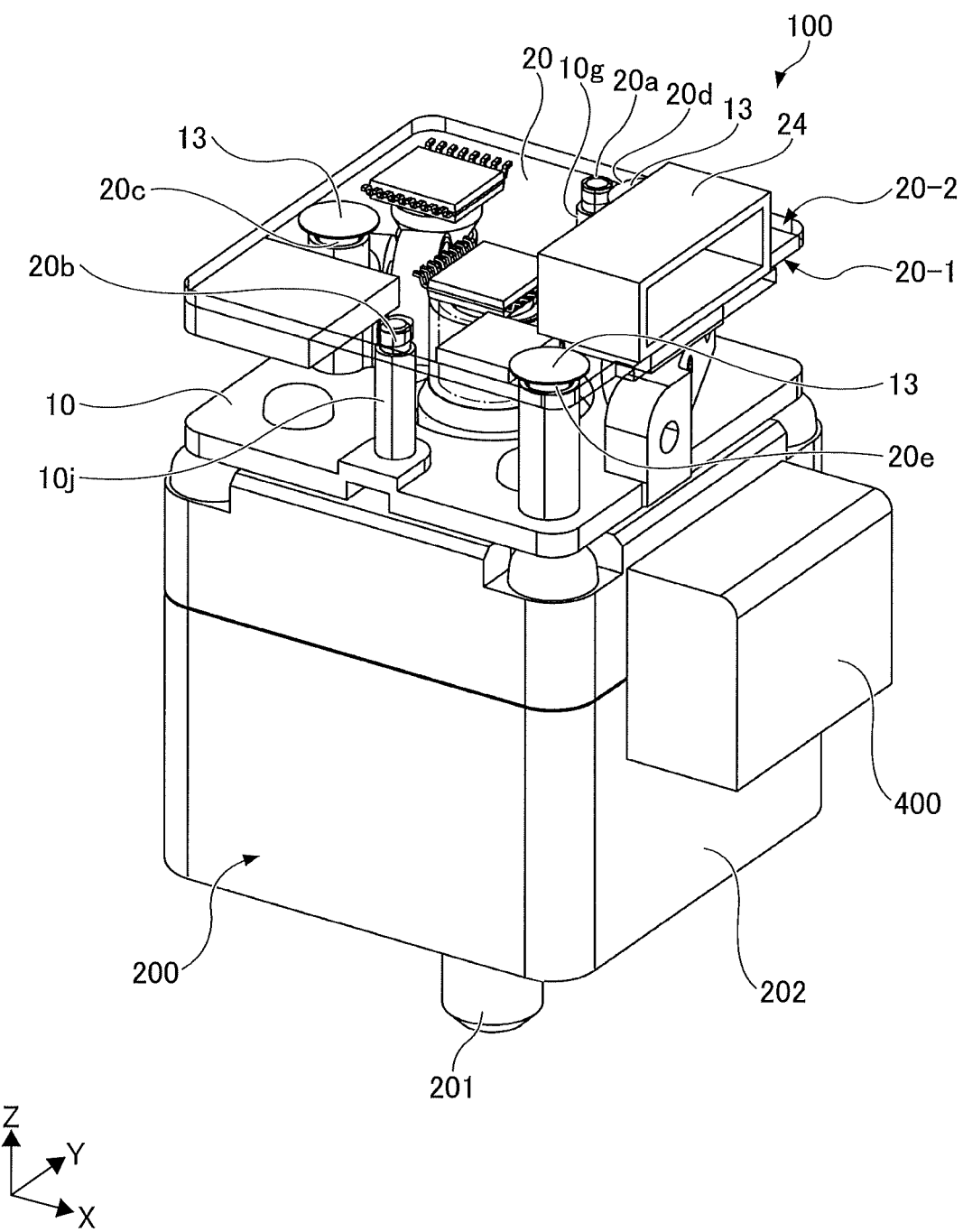
FIG. 2 is a perspective view of the absolute encoder 100, as illustrated in FIG. 1, from which a case 15 and a mounted screw 16 are removed.
Figure 3:
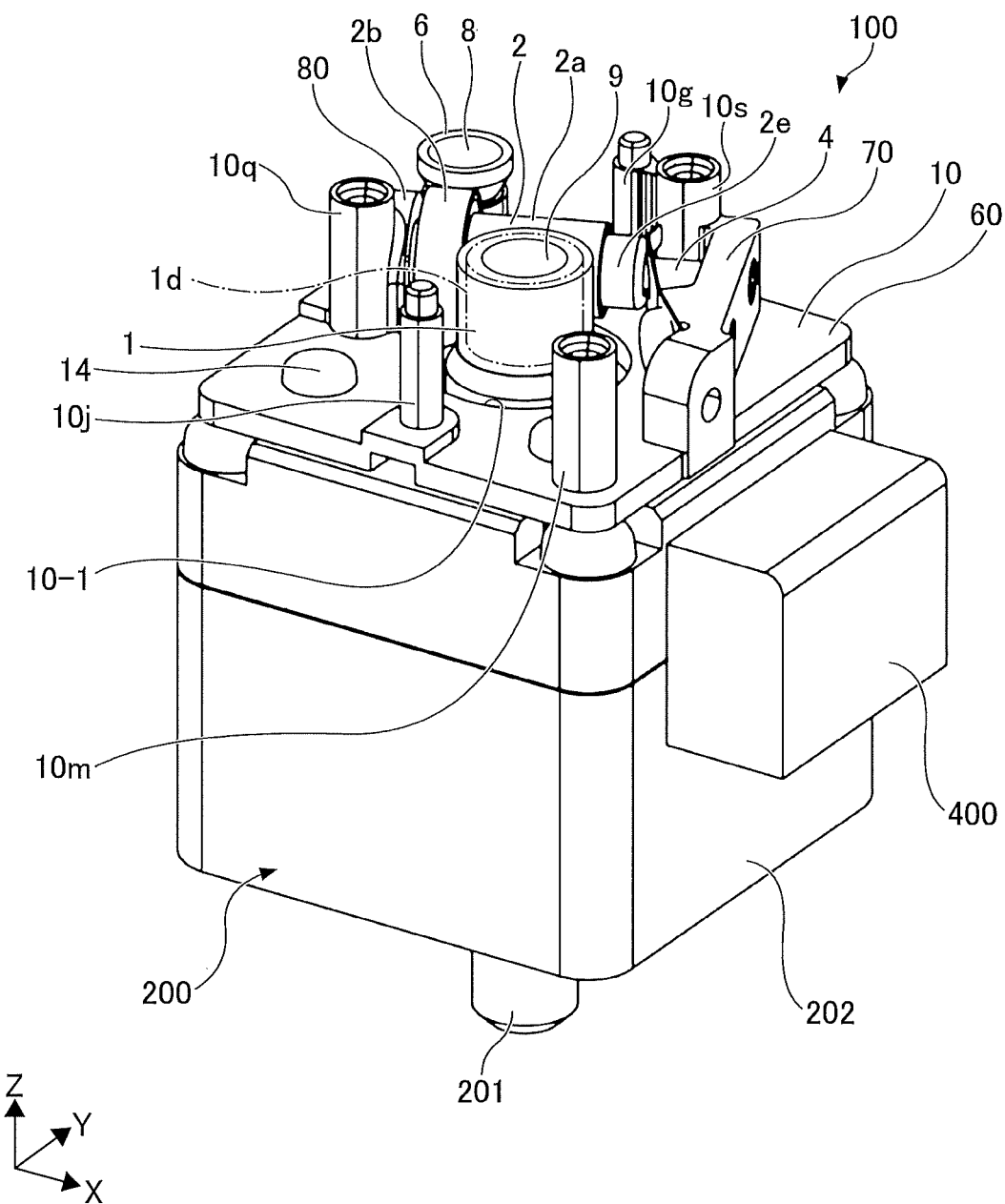
FIG. 3 is a perspective view of the absolute encoder 100, as illustrated in FIG. 2, from which a substrate 20 and substrate mounting screws 13 are removed.
Figure 4:
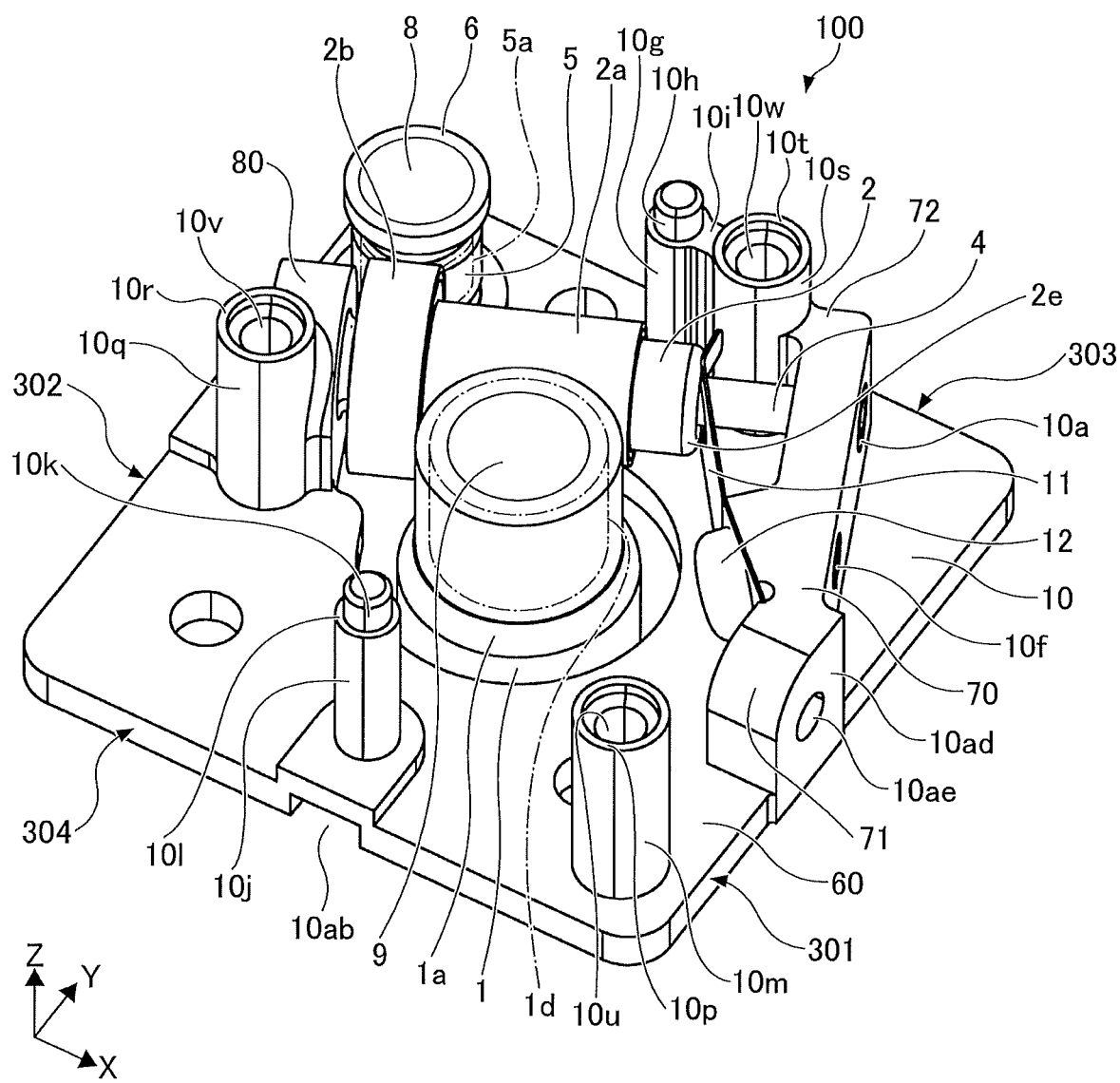
FIG. 4 is a perspective view of the absolute encoder 100 attached to the motor 200, as illustrated in the perspective view in FIG. 3, where the motor 200 and screws 14 are removed from the absolute encoder 100.
Figure 5:
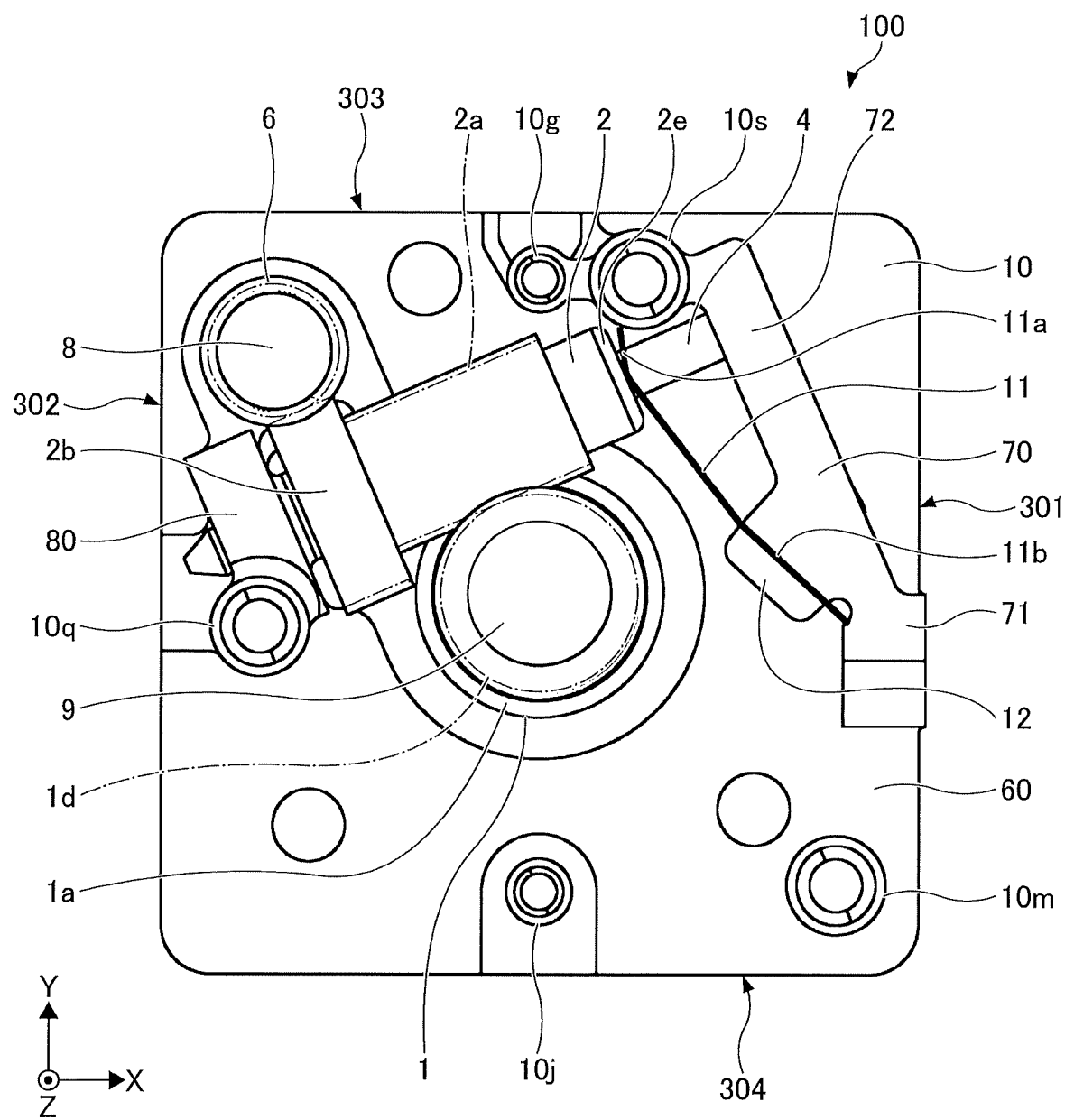
FIG. 5 is a plan view of a main base 10, an intermediate gear 2, and the like as illustrated in FIG. 4.
Figure 6:
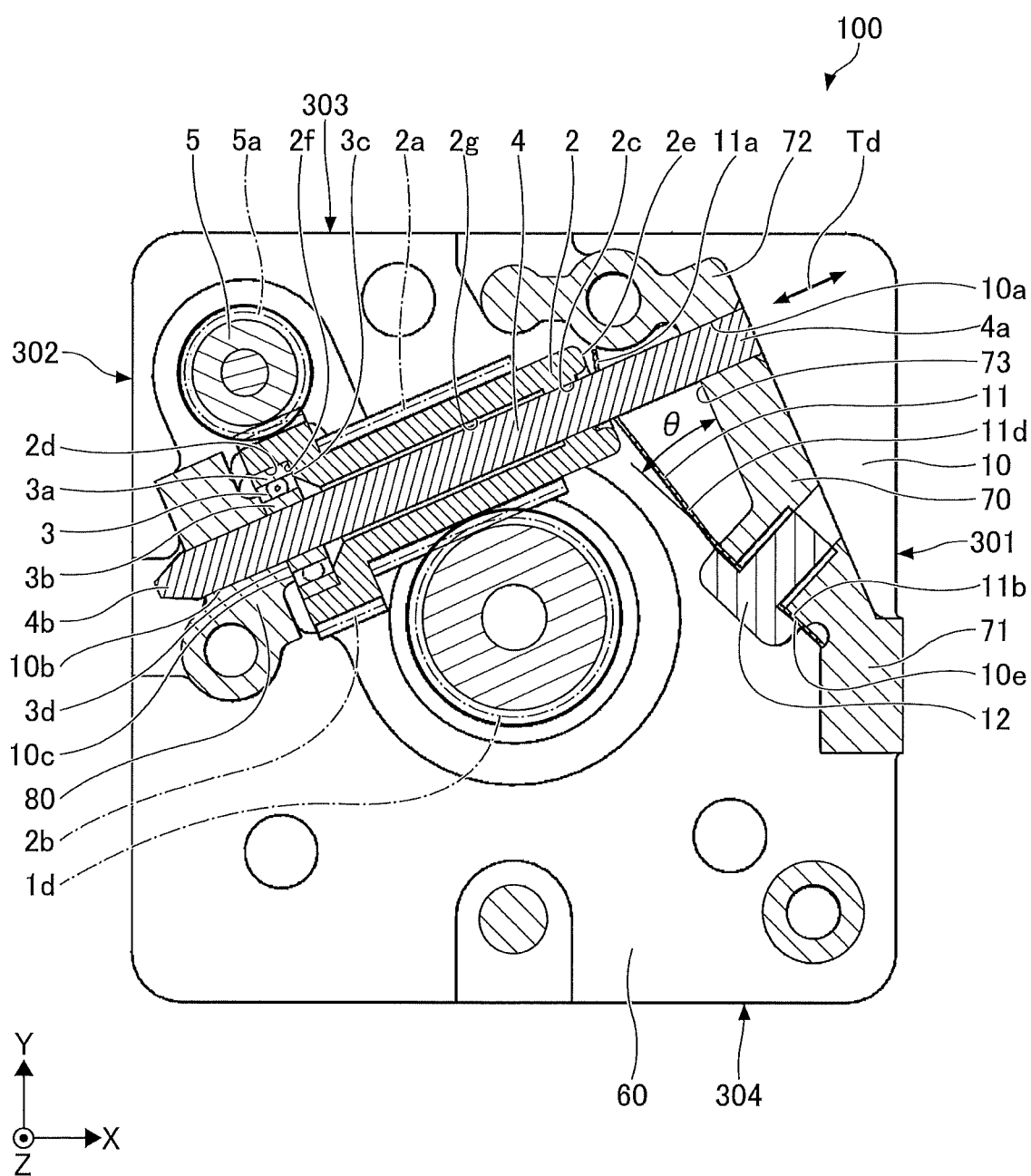
FIG. 6 is a cross-sectional view of the absolute encoder 100, as illustrated in FIG. 5, taken along a plane that passes through the center of the intermediate gear 2 and that is parallel to an X-Y plane.

FIG. 2 is a perspective view of the absolute encoder 100, as illustrated in FIG. 1, from which the case 15 and a mounted screw 16 are removed. In FIG. 2, multiple components provided on a lower surface 20-1 of the substrate 20 are illustrated transparently. FIG. 3 is a perspective view of the absolute encoder 100, as illustrated in FIG. 2, from which the substrate 20 and substrate mounting screws 13 are removed. FIG. 4 is a perspective view of the absolute encoder 100 attached to the motor 200, as illustrated in the perspective view in FIG. 3, where the motor 200 and screws 14 are removed from the absolute encoder 100. FIG. 5 is a plan view of a main base 10, an intermediate gear 2, and the like as illustrated in FIG. 4. In FIG. 5, arrangement of main components among components provided in the absolute encoder 100 is illustrated. FIG. 6 is a cross-sectional view of the absolute encoder 100, as illustrated in FIG. 5, taken along a plane that passes through the center of the intermediate gear 2 and that is parallel to an X-Y plane.

Figure 7:
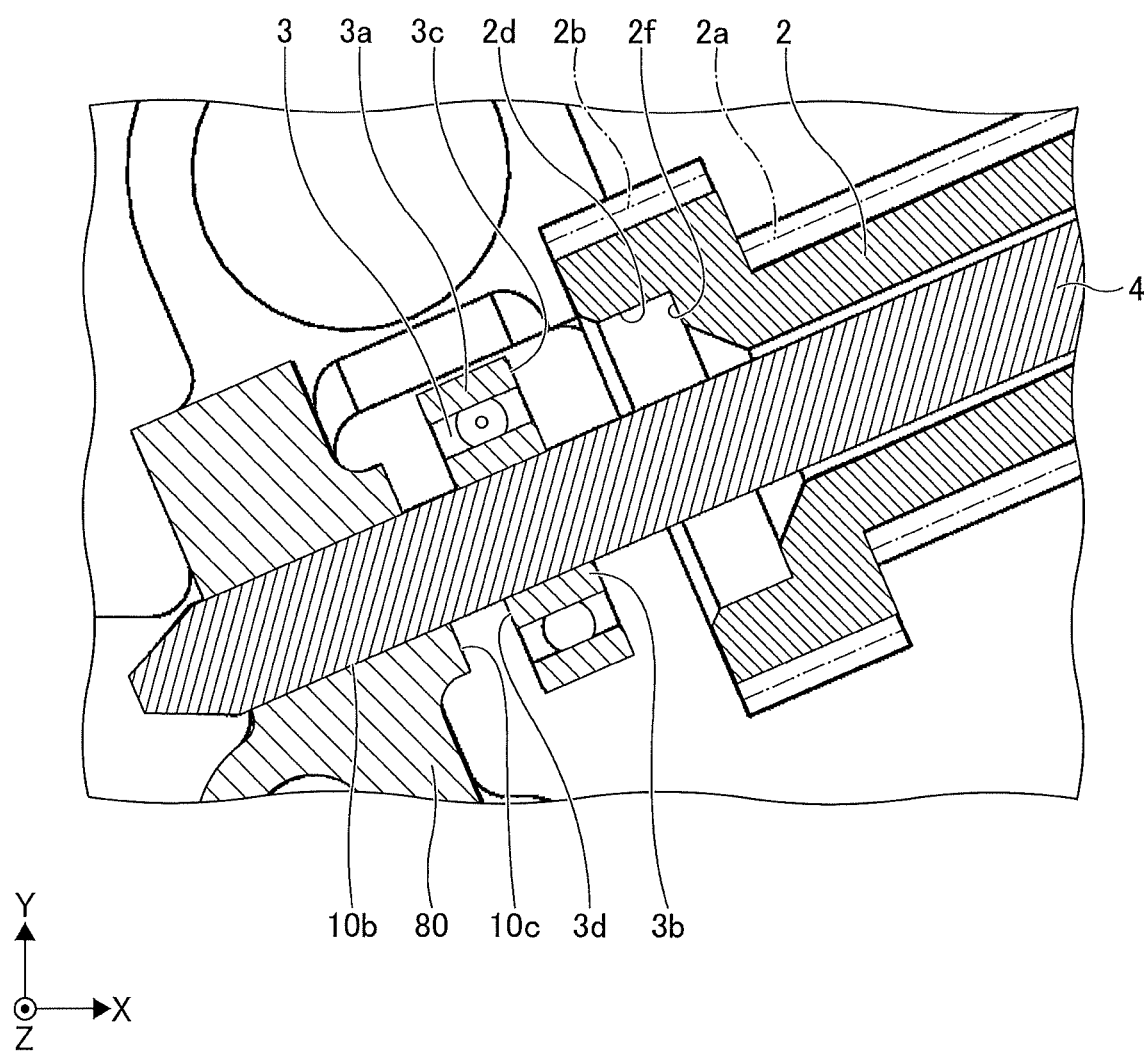
FIG. 7 is an enlarged partial cross-sectional view of a bearing 3 illustrated in FIG. 6 that is disconnected from the intermediate gear 2.

FIG. 7 is an enlarged partial cross-sectional view of a bearing 3 illustrated in FIG. 6 that is disconnected from the intermediate gear 2. In FIG. 7, in order to facilitate the understanding of the positional relationship between the bearing 3 and a press-fit portion 2d formed in the intermediate gear 2, the bearing 3 is separated from the press-fit portion 2d of the intermediate gear 2. Also, in FIG. 7, in order to facilitate the understanding of the positional relationship between the bearing 3 and a wall 80 provided on a base 60 of the main base 10, the bearing 3 is separated from the wall 80.

Figure 8:
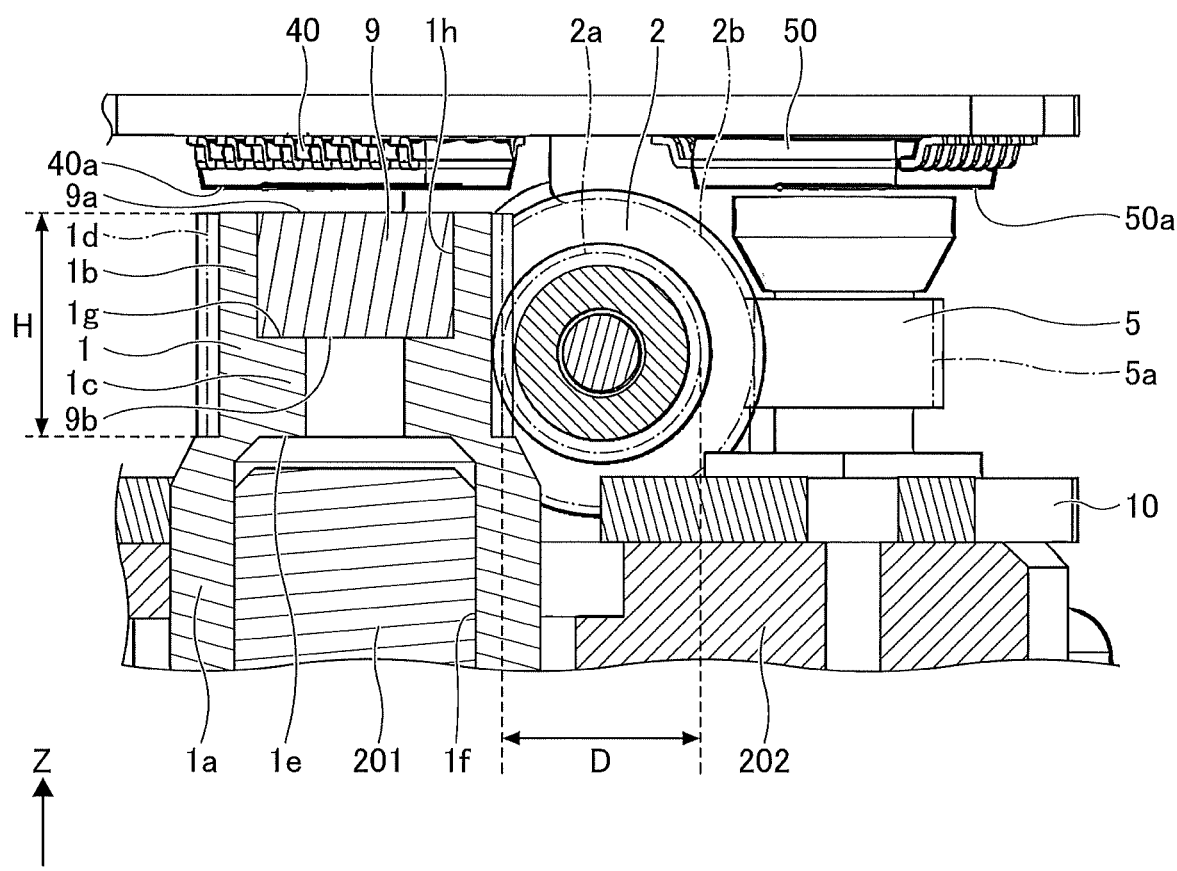
FIG. 8 is a cross-sectional view of the absolute encoder 100, as illustrated in FIG. 2, taken along a plane that passes through the center of a main spindle gear 1 illustrated in FIG. 5 and that is perpendicular to a centerline of the intermediate gear 2, where the substrate 20 and a magnetic sensor 40 are not illustrated in the cross section.

FIG. 8 is a cross-sectional view of the absolute encoder 100, as illustrated in FIG. 2, taken along a plane that passes through the center of a main spindle gear 1 illustrated in FIG. 5 and that is perpendicular to a centerline of the intermediate gear 2, where the substrate 20 and a magnetic sensor 40 are not illustrated in the cross section. In FIG. 8, an attached state of a permanent magnet 9 to the main spindle gear 1, and an attached state of the main spindle gear 1 to a motor shaft 201 are illustrated. Further, in FIG. 8, a state where a worm gear 1d of the main spindle gear 1 and a worm wheel 2a of the intermediate gear 2 are engaged with each other is illustrated. From FIG. 8, it is understood that an upper surface 9a of the permanent magnet 9 provided for the main spindle gear 1 is located at a fixed distance from the magnetic sensor 40, in the Z-axis direction.

Figure 9:
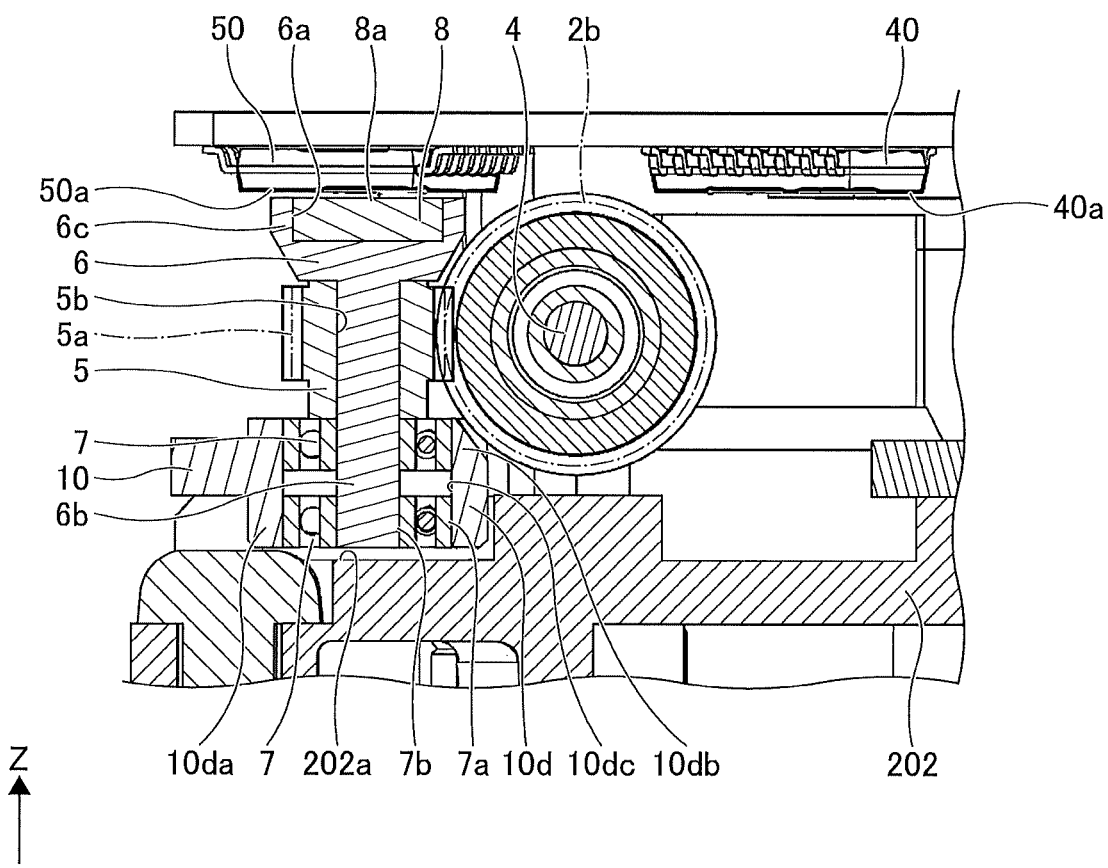
FIG. 9 is a cross-sectional view of the absolute encoder 100, as illustrated in FIG. 2, taken along a plane that passes through the center of a layshaft gear 5 illustrated in FIG. 6 and that is perpendicular to the centerline of the intermediate gear 2, where the substrate 20 and a magnetic sensor 50 are not illustrated in the cross section.

FIG. 9 is a cross-sectional view of the absolute encoder 100, as illustrated in FIG. 2, taken along a plane that passes through the center of a layshaft gear 5 illustrated in FIG. 6 and that is perpendicular to the center line of the intermediate gear 2, where the substrate 20 and a magnetic sensor 50 are not illustrated in the cross section. In FIG. 9, a state in which a worm wheel 5a and a worm gear 2b are engaged with each other is illustrated. Further, in FIG. 9, a state where a shaft 6b of a magnet holder 6 is held by two bearings 7, and a state where the permanent magnet 8 is held by the magnet holder 6 are illustrated. Moreover, in FIG. 9, a state where a radially outer surface of a head 6c provided in the magnet holder 6 is separated from an addendum circle of the worm gear 2b is illustrated. From FIG. 9, it is understood that a surface 8a of the permanent magnet 8 provided at the magnet holder 6 is located at a fixed distance from the magnetic sensor 50, in the Z-axis direction. FIG. 9 also illustrates a cross-sectional shape of a bearing holder 10*d* of the main base 10.

Figure 10:
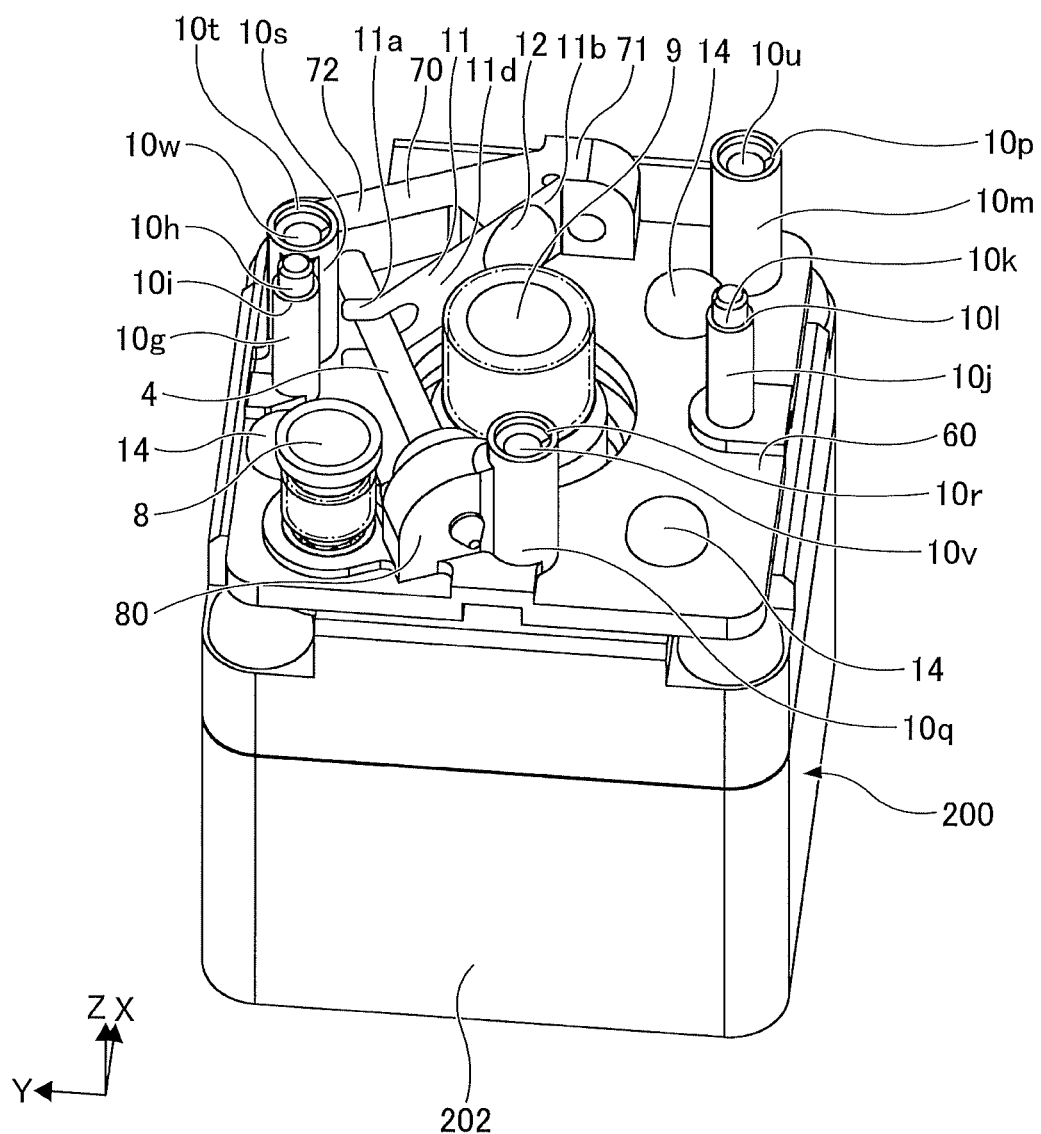
FIG. 10 is a perspective view of multiple components, as illustrated in FIG. 3, from which the intermediate gear 2 is removed.
Figure 11:
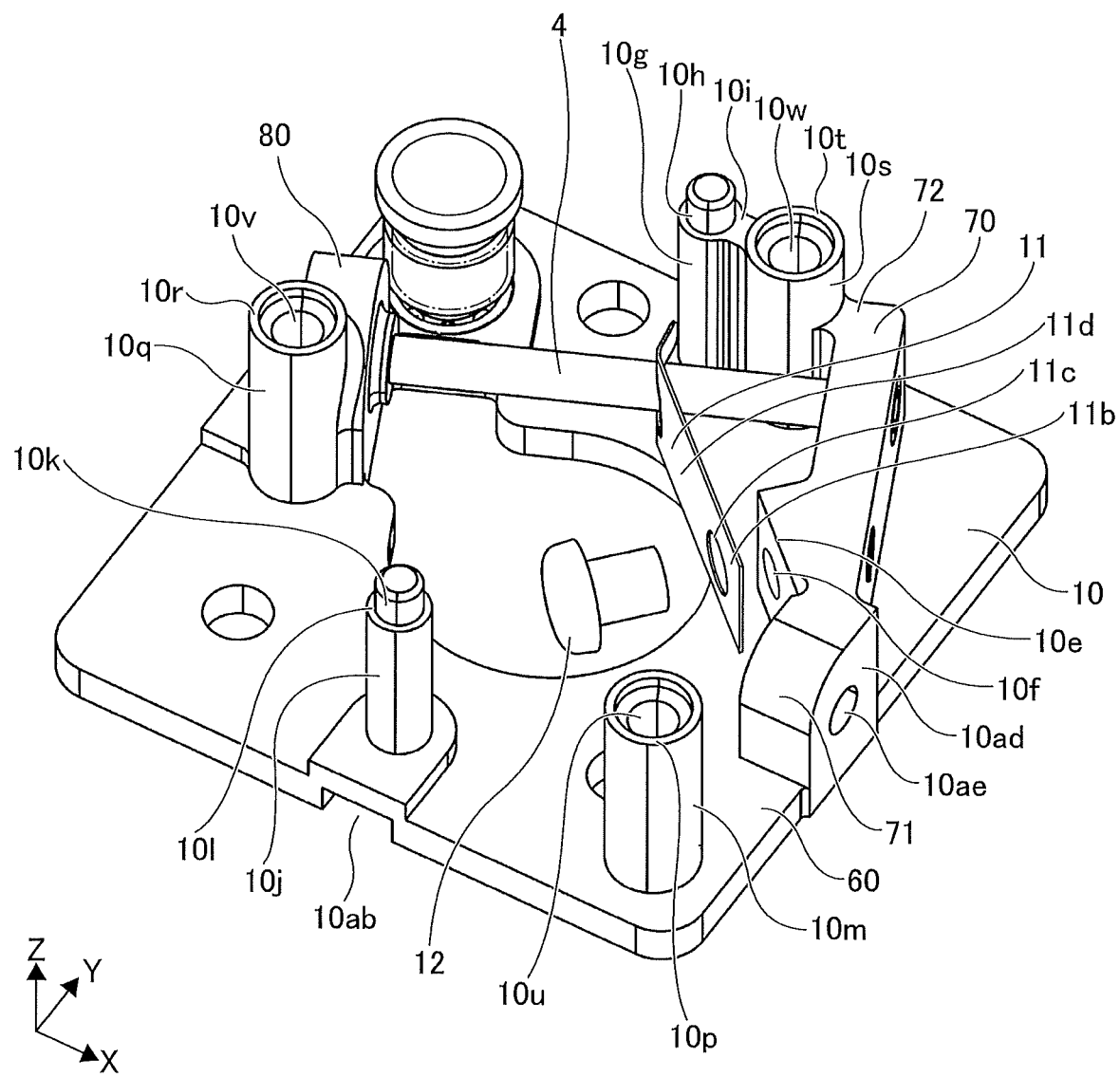
FIG. 11 is a perspective view of a wall 70, as illustrated in FIG. 10, from which a screw 12 is removed, a leaf spring 11 after the screw 12 is removed, and the wall 70 with a leaf-spring mounting surface 10e facing the leaf spring 11, where the motor 200 and the main spindle gear 1 are not illustrated.

FIG. 10 is a perspective view of multiple components, as illustrated in FIG. 3, from which the intermediate gear 2 is removed. FIG. 11 is a perspective view of a wall 70, as illustrated in FIG. 10, from which a screw 12 is disconnected, a leaf spring 11 after the screw 12 is disconnected, and the wall 70 with a leaf-spring mounting surface 10*e* facing the leaf spring 11, where the motor 200 and the main spindle gear 1 are not illustrated.

Figure 12:
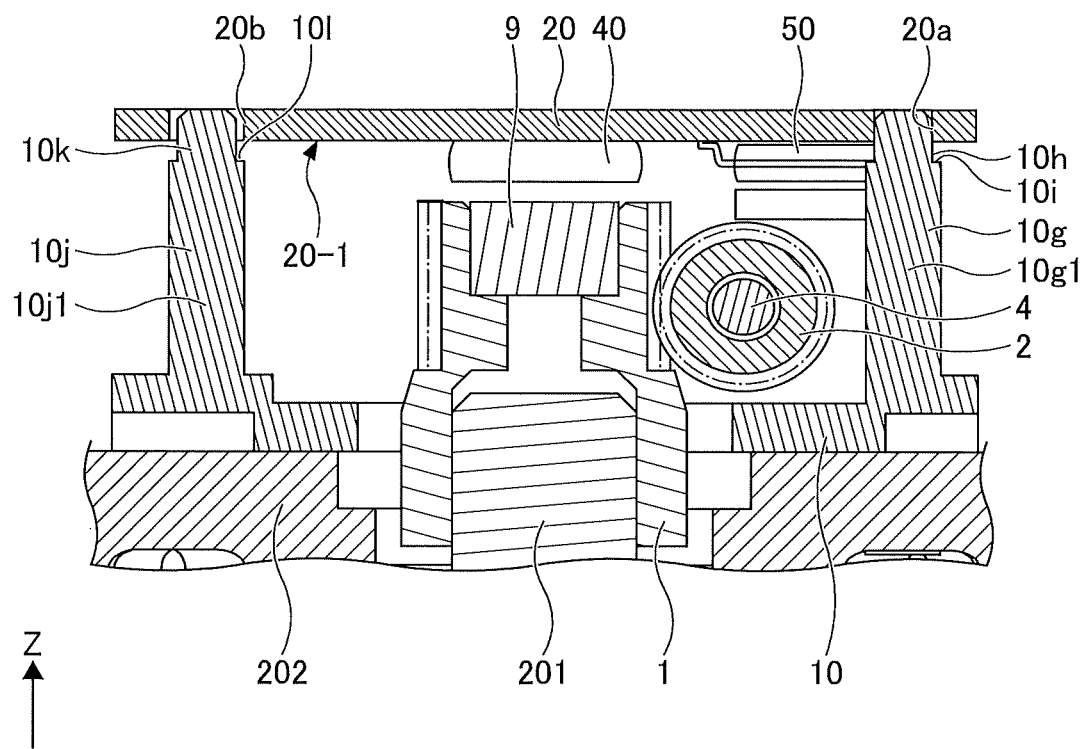
FIG. 12 is a cross-sectional view of the absolute encoder 100, as illustrated in FIG. 2, taken along a plane that passes through the center of a substrate positioning pin 10g and the center of a substrate positioning pin 10j, as illustrated in FIG. 5, and that is parallel to a Z-axis direction, where a magnetic sensor 40 is not illustrated in the cross section.

FIG. 12 is a cross-sectional view of the absolute encoder 100, as illustrated in FIG. 2, taken along a plane that passes through the center of a substrate positioning pin 10*g* and the center of a substrate positioning pin 10*j*, as illustrated in FIG. 5, and that is parallel to a Z-axis direction, where the magnetic sensor 40 is not illustrated in the cross section.

Figure 13:
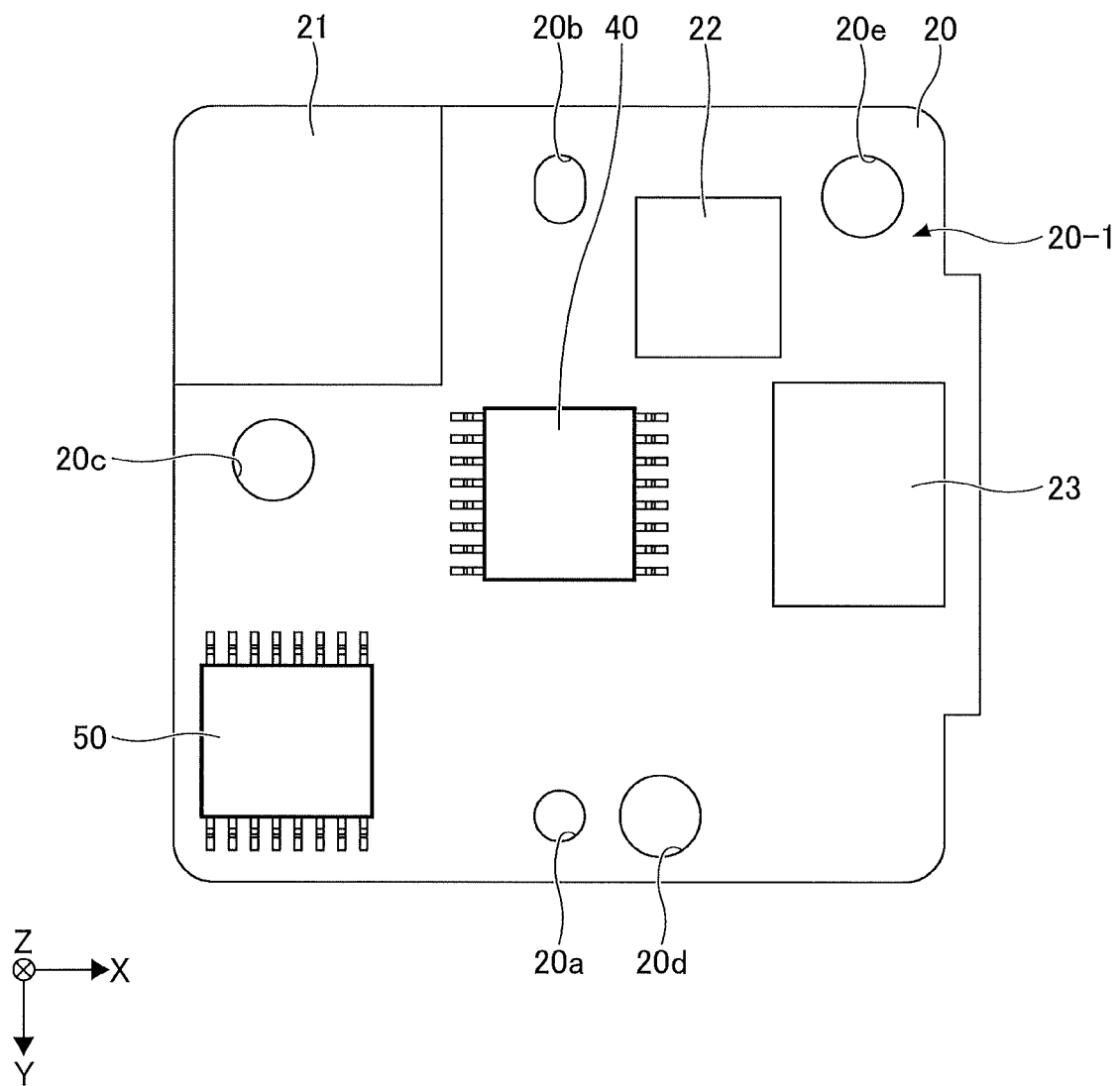
FIG. 13 is a view of the substrate 20 illustrated in FIG. 2 when viewed from a lower surface 20-1 thereof.
Figure 14:
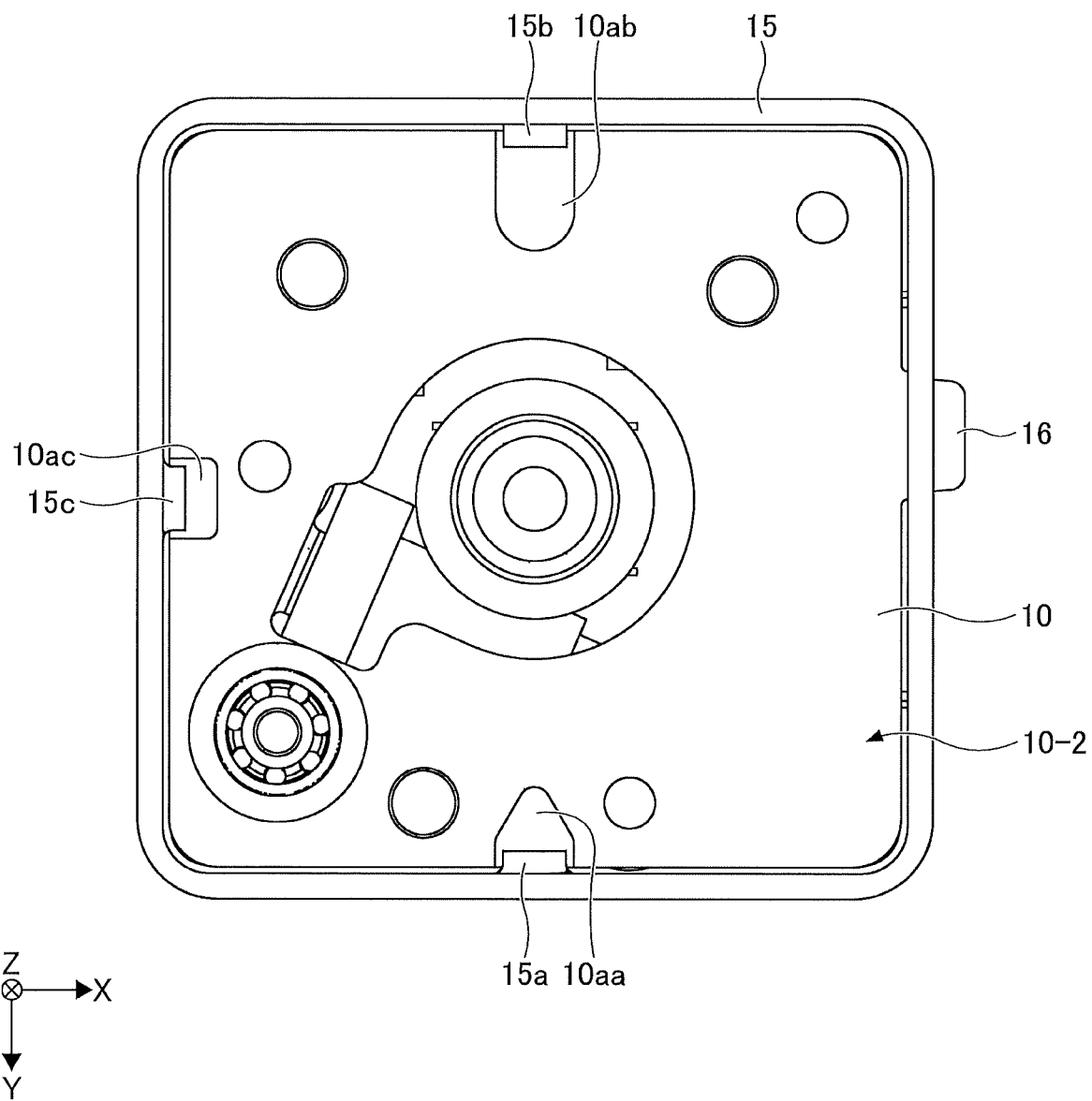
FIG. 14 is a view of the absolute encoder in FIG. 1 from which the motor 200 is removed and that is illustrated when viewed from a lower surface 10-2 of the main base 10.
Figure 15:
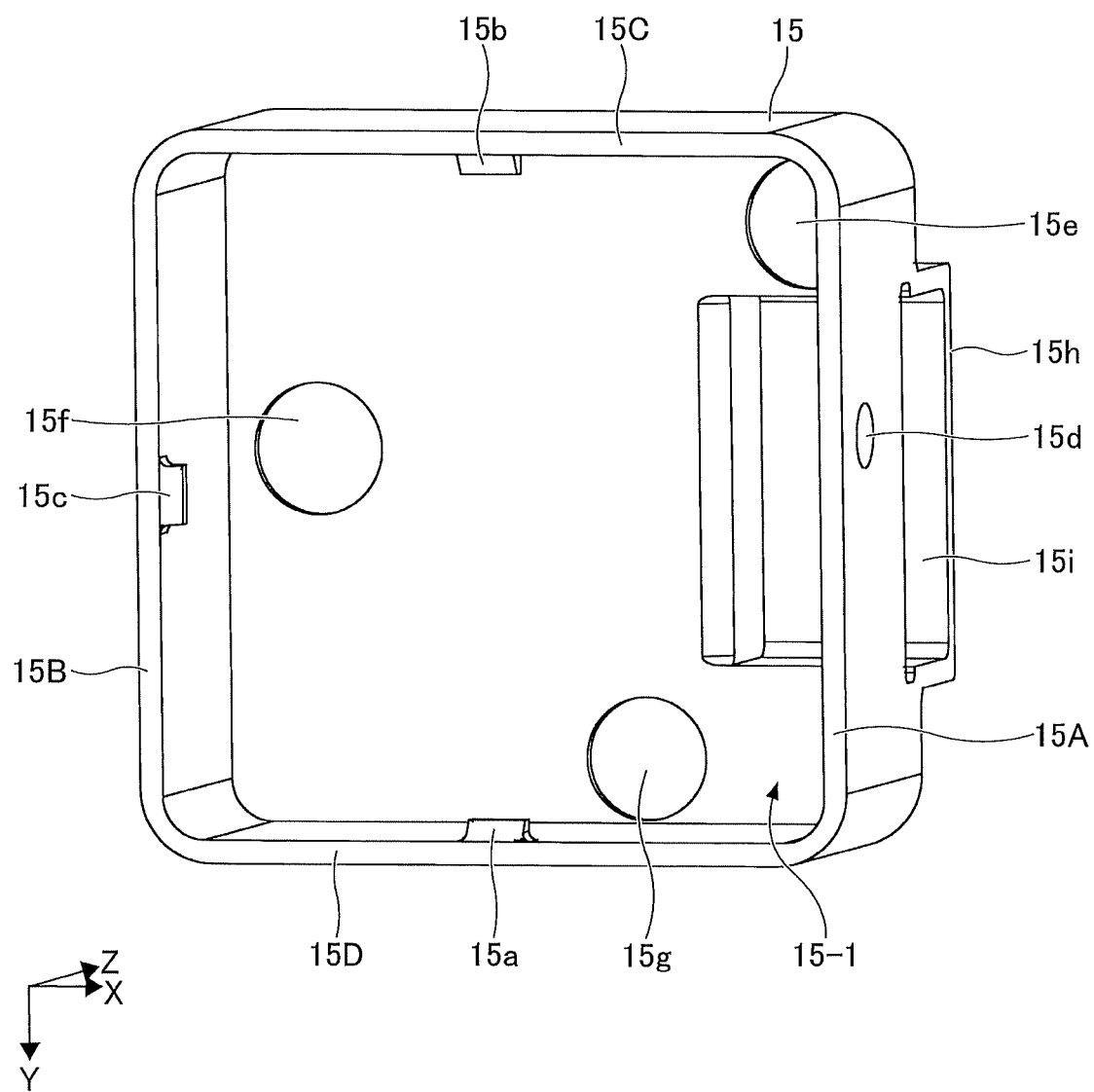
FIG. 15 is a perspective view of the case 15 illustrated in FIG. 1.

FIG. 13 is a view of the substrate 20 illustrated in FIG. 2 when viewed from the lower surface 20-1 thereof. FIG. 14 is a view of the absolute encoder in FIG. 1 from which the motor 200 is removed and that is illustrated when viewed from the lower surface 10-2 of the main base 10. The lower surface 10-2 of the main base 10 is a surface opposite an upper surface of the main base 10 illustrated in FIG. 11. The lower surface 10-2 of the main base 10 is also a surface facing the motor 200. FIG. 15 is a perspective view of the case 15 illustrated in FIG. 1.

Figure 16:
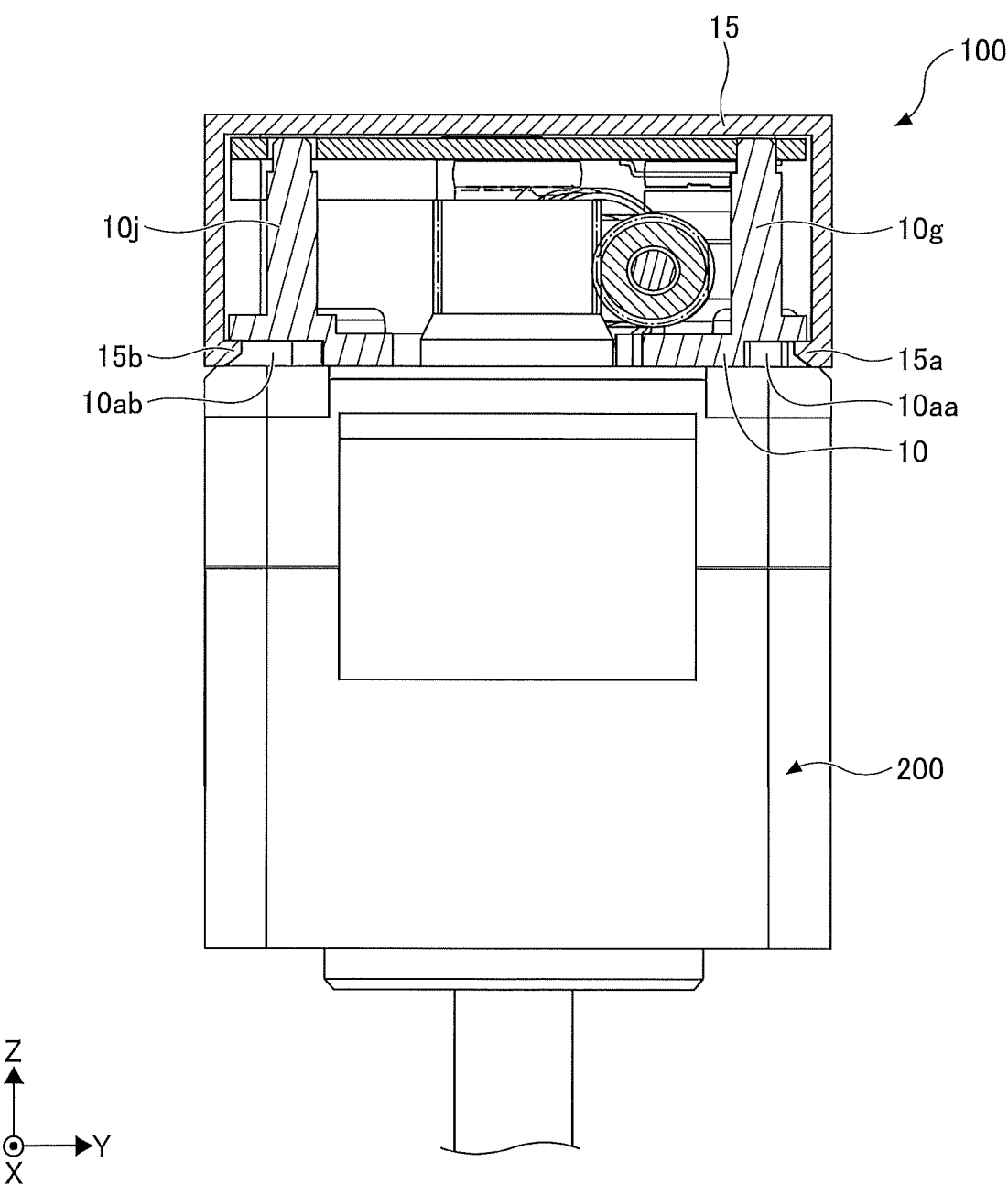
FIG. 16 is a cross-sectional view of the absolute encoder 100, as illustrated in FIG. 1, taken along a plane that passes through the center of the substrate positioning pin 10g and the center of the substrate positioning pin 10j, as illustrated in FIG. 3, and that is parallel to the Z-axis direction, where the motor 200 and the main spindle gear 1 are not illustrated in the cross section.
Figure 17:
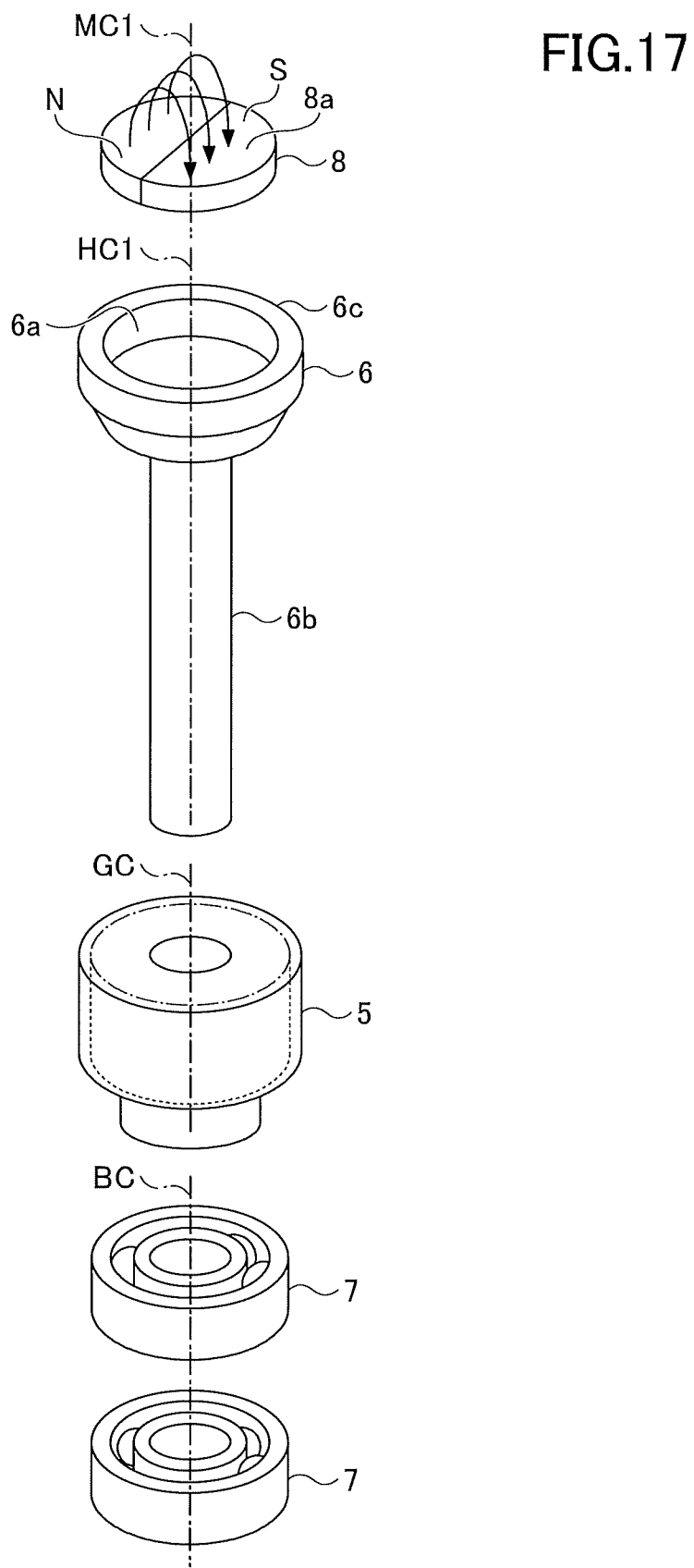
FIG. 17 is an exploded perspective view of a permanent magnet 8, a magnet holder 6, the layshaft gear 5, and bearings 7 as illustrated in FIG. 9.
Figure 18:
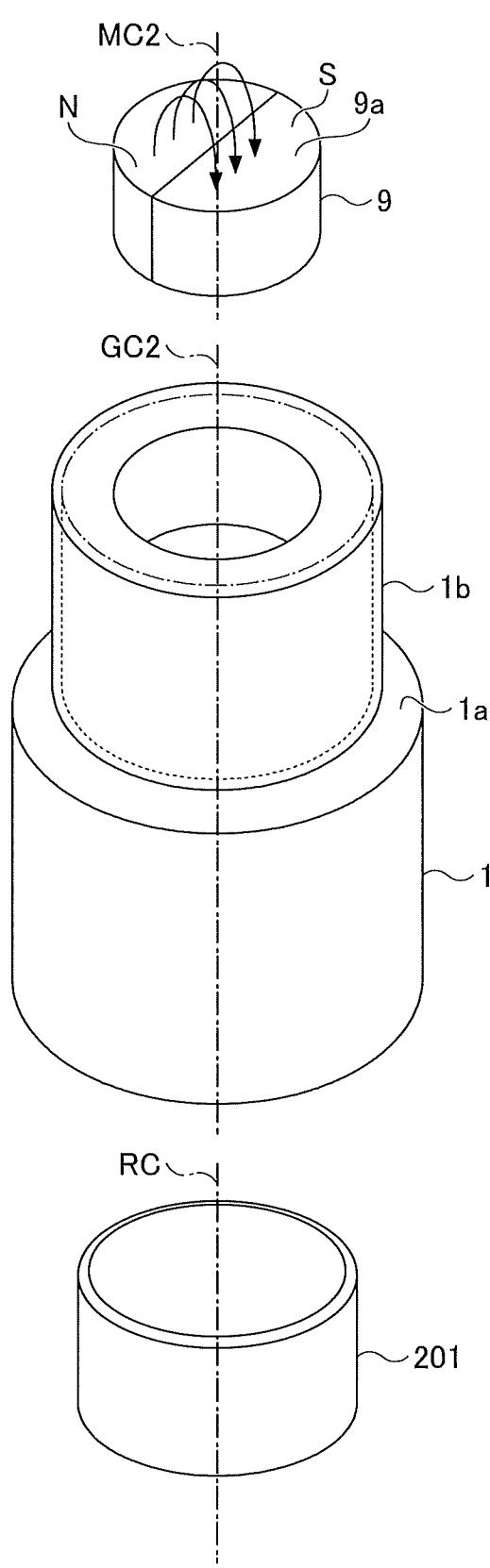
FIG. 18 is an exploded perspective view of a permanent magnet 9, the main spindle gear 1, and a motor shaft 201 as illustrated in FIG. 8.

FIG. 16 is a cross-sectional view of the absolute encoder 100, as illustrated in FIG. 1, taken along a plane that passes through the center of the substrate positioning pin 10*g* and the center of the substrate positioning pin 10*j*, as illustrated in FIG. 3, and that is parallel to the Z-axis direction, where the motor 200, the main spindle gear 1, and the magnetic sensor 40 are not illustrated in the cross section. In FIG. 16, a state where a tab 15*a* provided in the case 15 is engaged with a recessed portion 10*aa* provided in the main base 10, and a state where a tab 15*b* provided in the case 15 is engaged with a recessed portion 10*ab* provided in the main base 10, are illustrated. FIG. 17 is an exploded perspective view of the permanent magnet 8, the magnet holder 6, the layshaft gear 5, and the bearings 7 as illustrated in FIG. 9. FIG. 18 is an exploded perspective view of the permanent magnet 9, the main spindle gear 1, the motor shaft 201 as illustrated in FIG. 8.

Hereafter, the configuration of the absolute encoder 100 will be described in detail with reference to FIGS. 1 to 18. The absolute encoder 100 includes the main spindle gear 1, the intermediate gear 2, the bearing 3, a shaft 4, the layshaft gear 5, the magnet holder 6, the bearings 7, the permanent magnet 8, and the permanent magnet 9. The absolute encoder 100 includes the main base 10, the leaf spring 11, the screw 12, the substrate mounting screws 13, the screws 14, the case 15, the mounted screw 16, and the substrate 20. The absolute encoder 100 includes a microcomputer 21, a bidirectional driver 22, a line driver 23, a connector 24, the magnetic sensor 40, and the magnetic sensor 50.

The motor 200 may be, for example, a stepping motor, a DC brushless motor, or the like. For example, the motor 200 is used as a drive source that drives a robot such as an industrial robot, via a deceleration mechanism such as strain wave gearing. The motor 200 includes the motor shaft 201. As illustrated in FIG. 8, one end of the motor shaft 201 protrudes from a housing 202 of the motor 200 in the positive Z-axis direction. As illustrated in FIG. 1, the other end of the motor shaft 201 protrudes from the housing 202 of the motor 200 in the negative Z-axis direction.

The outline shape of the motor 200 in a plan view is, for example, a square shape. Each of four sides corresponding to the appearance of the motor 200 has a length of 25 mm. Among the four sides corresponding to the outline of the motor 200, each of a first side and a second side parallel to the first side is parallel to the Y-axis. Among the four sides, each of a third side adjacent to the first side and a fourth side parallel to the third side is parallel to the X-axis. Also, the absolute encoder 100 provided for the motor 200 is a 25 mm per side square, corresponding to the outline shape of the motor 200, which is a 25 mm per side square in a plan view.

Hereafter, each of the components provided in the absolute encoder 100 will be described.

As illustrated in FIG. 8, the main spindle gear 1 is a cylindrical member that is coaxially provided with the motor shaft 201. The main spindle gear 1 includes a first cylindrical portion 1*a* being cylindrical, and a second cylindrical portion 1*b* being cylindrical and being coaxially provided with the first cylindrical portion 1*a*, toward the positive Z-axis direction of the first cylindrical portion 1*a*. The main spindle gear 1 includes a communicating portion 1*c* that connects the first cylindrical portion 1*a*, which is provided inwardly in a radial direction of the second cylindrical portion 1*b*, and includes the second cylindrical portion 1*b* and a worm gear 1*d* provided outwardly in the radial direction of the second cylindrical portion 1*b*. In such a manner, by forming the communicating portion 1*c*, the communicating portion 1*c* serves as a path for escaping the air when the main spindle gear 1 is press-fitted into the motor shaft 201. An inner diameter of the communicating portion 1*c* is smaller than an inner diameter of each of the first cylindrical portion 1*a* and an inner diameter of the second cylindrical portion 1*b*. A space surrounded by a bottom 1*e* of the communicating portion 1*c*, which is an end surface thereof in the negative Z-axis direction, and an inner peripheral surface of the first cylindrical portion 1*a*, is defined as a press-fit portion 1*f* for securing the main spindle gear 1 to an end portion of the motor shaft 201. The press-fit portion 1*f* is a recessed portion to recess the end portion of the first cylindrical portion 1*a*, from the negative Z-axis direction toward the positive Z-axis direction. The motor shaft 201 is press-fitted into the press-fit portion 1*f*, and the main spindle gear 1 rotates integrally with the motor shaft 201. The worm gear 1*d* is a gear of the main spindle gear 1.

A space surrounded by a bottom 1*g*, which is an end surface of the communicating portion 1*c* in the positive Z-axis, and an inner peripheral surface of a second cylindrical portion 1*b*, is defined as a magnet holding portion 1*h* for securing the permanent magnet 9. The magnet holding portion 1*h* is a recessed portion to recess the end portion of the second cylindrical portion 1*b*, from the positive Z-axis toward the negative Z-axis direction. The permanent magnet 9 is press-fitted into the magnet holding portion 1*h*. The outer peripheral surface of the permanent magnet 9 press-fitted into the magnet holding portion 1*h* contacts the inner peripheral surface of the second cylindrical portion 1*b*, and the lower surface 9*b* of the permanent magnet 9 contacts the bottom 1*g* of the second cylindrical portion 1*b*. In such a manner, the permanent magnet 9 is positioned in an axial direction and is positioned in the direction perpendicular to the axial direction. The axial direction of the permanent magnet 9 corresponds to the central axis direction of the motor shaft 201.

As illustrated in FIGS. 4 to 6, and FIG. 8, the worm gear 1*d* is composed of helically formed teeth, and engages with the worm wheel 2*a* of the intermediate gear 2. The worm wheel 2*a* is a gear of the intermediate gear 2. In FIG. 8, illustration of the teeth shape is omitted. The worm gear $1d$ is formed of, for example, a polyacetal resin. The worm gear $1d$ is an example of a first drive gear.

As illustrated in FIGS. 4 to 7, and the like, the intermediate gear 2 is rotatably supported by the shaft 4, above the upper surface of the main base 10. The central axis of the intermediate gear 2 is parallel to the X-Y plane. The central axis of the intermediate gear 2 is not parallel to each of the X axis and Y axis in a plan view. In other words, the central axis direction of the intermediate gear 2 is oblique to an extending direction of each of the X axis and Y axis. When the central axis direction of the intermediate gear 2 is oblique to the extending direction of each of the X axis and Y axis, it means that the central axis of the intermediate gear 2 extends obliquely with respect to each of four sides of the main base 10. As illustrated in FIGS. 4 and 5, the four sides of the main base 10 are composed of a first side 301 parallel to the Y-Z plane, a second side 302 parallel to the first side 301, a third side 303 that is parallel to the X-Z plane and that is adjacent to the first side 301, and a fourth side 304 parallel to the third side 303. The first side 301 is a side of the main base 10 provided toward the positive X-axis direction. The second side 302 is a side of the main base 10 provided toward the negative X-axis direction. The third side 303 is a side of the main base 10 provided toward the positive Y-axis direction. The fourth side 304 is a side of the main base 10 provided toward the negative Y-axis direction.

As an example, the dimensions of the absolute encoder 100 in a plan view are adjusted to correspond to the dimensions of the motor 200 that is a square of 25 mm sides. In such a manner, the intermediate gear 2 disposed parallel to the X-Y plane is provided so as to extend obliquely with respect to each of the four sides of the main base 10, and thus the dimensions of the absolute encoder 100 can be reduced in a horizontal direction. The horizontal direction corresponds to a direction perpendicular to the central axis of the motor shaft 201, and corresponds to a direction parallel to the X-Y plane.

As illustrated in FIGS. 3 to 7, and the like, the intermediate gear 2 includes the worm wheel $2a$, the worm gear $2b$, a shaft receiving portion $2c$, the press-fit portion $2d$, a sliding portion $2e$, a bottom $2f$, and a through-hole $2g$. The intermediate gear 2 is a cylindrical member in which the shaft 4 is inserted into the through-hole $2g$, through which the member is provided along a central axis of the intermediate gear 2. The through-hole $2g$ defines a space surrounded by the inner peripheral surface of the intermediate gear 2. The intermediate gear 2 is a member integrally formed of metal, resin, or the like. In this description, as an example, the intermediate gear 2 is formed of a polyacetal resin.

The worm wheel $2a$ is a gear that the worm gear $1d$ of the main spindle gear 1 engages with. The worm wheel $2a$ is an example of a first driven gear and is a gear of the intermediate gear 2. The worm wheel $2a$ is axially provided at a location near a middle portion of the intermediate gear 2, in an axial direction Td of the intermediate gear 2 as represented by the arrow in FIG. 6. The worm wheel $2a$ is configured with a plurality of teeth that are provided on the outer periphery of a given cylindrical portion of the intermediate gear 2.

The outer diameter of the worm wheel $2a$ is smaller than the outer diameter of the worm gear $1d$. The central axis of the worm wheel $2a$ is parallel to the upper surface of the main base 10, and when the outer diameter of the worm wheel $2a$ is decreased, the size of the absolute encoder 100 can be reduced in the Z-axis direction (height direction).

The worm gear $2b$ is configured with helically formed teeth, and is provided adjacently and coaxially with the worm wheel $2a$. The worm gear $2b$ is provided on the outer periphery of a given cylindrical portion of the intermediate gear 2. When the worm gear $2b$ engages with the worm wheel $5a$ provided in the layshaft gear 5, a rotating force of the intermediate gear 2 is transmitted to the layshaft gear 5. The worm gear $2b$ is an example of a second drive gear, and is a gear of the intermediate gear 2. The worm wheel $5a$ is a gear of the layshaft gear 5. When viewed from a direction that is both perpendicular to the centerline of the worm wheel $5a$ and perpendicular to the centerline of the worm gear $2b$, the centerline of the worm wheel $5a$ and perpendicular to the centerline of the worm gear $2b$ intersect each other.

A smaller value for the outer diameter of the worm gear $2b$ is set to the extent possible, in order to allow for the reduced size of the absolute encoder 100 in the Z-axis direction (height direction).

As illustrated in FIG. 6, the shaft receiving portion $2c$ is provided on the side of the intermediate gear 2 opposite the press-fit portion $2d$. That is, on the sliding portion $2e$-side of the intermediate gear 2, the shaft receiving portion $2c$ is provided radially and inwardly on the inner peripheral surface of the intermediate gear 2. The shaft 4 capable of sliding is inserted through the shaft receiving portion $2c$, and the intermediate gear 2 is rotatably supported by the shaft 4.

The press-fit portion $2d$ is a recessed portion inside the worm gear $2b$ to recess, in the axial direction Td, an end surface of the intermediate gear 2 toward a middle portion of the intermediate gear 2, and communicates with the through-hole $2g$. The press-fit portion $2d$ can be defined as a portion of the through-hole $2g$, where an opening diameter at an end portion of the through-hole $2g$ is increased. An outer ring $3a$ of the bearing 3 is press-fitted into and secured to the press-fit portion $2d$.

As illustrated in FIGS. 4 to 6, FIG. 10, and FIG. 11, and the like, the sliding portion $2e$ of the intermediate gear 2 is provided at one end of the intermediate gear 2. That is, the sliding portion $2e$ is provided opposite the worm gear $2b$ with respect to the axial direction Td on the side of the intermediate gear 2. The sliding portion $2e$ of the intermediate gear 2 contacts a sliding portion $11a$ of the leaf spring 11. The leaf spring 11 is an example of an elastic member and is, for example, made of metal. The sliding portion $11a$ of the leaf spring 11 is configured with two bifurcated portions each of which is branched from a base $11d$ of the leaf spring 11. The base $11d$ of the leaf spring 11 is a plate-shaped member provided between a mounting portion $11b$ and the sliding portion $11a$ in the entire leaf spring 11.

A space defining a greater diameter than the shaft 4 is formed between the two bifurcated portions that constitute the sliding portion $11a$ of the leaf spring 11. In such a manner, each of the two bifurcated portions extends across the shaft 4, and the mounting portion $11b$ of the leaf spring 11 is secured to the leaf-spring mounting surface $10e$ with the screw 12, so as not to contact the shaft 4, where the leaf-spring mounting surface $10e$ is disposed on a wall 72 of the main base 10.

After the intermediate gear 2 is assembled, the sliding portion $11a$ of the leaf spring 11 is disposed at a location facing the sliding portion $2e$ of the intermediate gear 2. The sliding portion $2e$ of the intermediate gear 2 contacts the sliding portion $11a$ of the leaf spring 11, and when the sliding portion $2e$ is pressed by the sliding portion $11a$, the sliding portion $2e$ is preloaded in a direction from one end $4a$ of the shaft 4 to the other end $4b$ of the shaft along the central axis of the shaft 4. In such a state, when the intermediate gear 2 rotates, the sliding portion 2e of the intermediate gear 2 slides, while contacting the sliding portion 11a of the leaf spring 11.

The bottom 2f of the intermediate gear 2 is positioned next to the press-fit portion 2d and contacts a side surface 3c of the outer ring 3a of the bearing 3. The outer ring 3a is press-fitted into the press-fit portion 2d until the side surface 3c of the outer ring 3a contacts the bottom 2f.

The through-hole 2g of the intermediate gear 2 passes through the intermediate gear 2 along the central axis of the intermediate gear, from the shaft receiving portion 2c toward the press-fit portion 2d, and is disposed coaxially with the shaft 4. The inner diameter of the through-hole 2g is greater than the outer diameter of the shaft 4, and thus a given space is secured between the through-hole 2g and the outer peripheral surface of the shaft 4.

As illustrated in FIG. 6 and FIG. 7, the bearing 3 includes the outer ring 3a, an inner ring 3b, the side surface 3c, and a side surface 3d. The side surface 3c of the bearing 3 is a side surface of the outer ring 3a in the axial direction Td of the shaft 4, as represented by the arrow in FIG. 6, and the side surface 3d of the bearing 3 is a side surface of the inner ring 3b in such an axial direction. Note that in the embodiment of the present invention, the (central) axial direction of each of the intermediate gear 2 and the shaft 4 is represented by Td.

The outer ring 3a of the bearing 3 is press-fitted into and secured to the press-fit portion 2d, and the side surface 3c contacts the bottom 2f and thus is secured. The shaft 4 is inserted into the inner ring 3b. As illustrated in FIG. 6, the side surface 3d of the inner ring 3b contacts a contact surface 10c of the wall 80 of the main base 10. With the contact surface 10c, a location of the intermediate gear 2 in the axial direction Td is determined. As described above, the intermediate gear 2 is preloaded by the leaf spring 11, in the axial direction Td from one end 4a of the shaft 4 toward the other end 4b of the shaft 4, and thus the side surface 3c of the outer ring 3a of the bearing 3 in contact with the bottom 2f of the intermediate gear 2 is also preloaded in the same direction as the axial direction. Accordingly, the inner ring 3b of the bearing 3 is also preloaded in the same direction as the above direction, so that the side surface 3d of the inner ring 3b of the bearing 3 becomes in contact with the contact surface 10c of the wall 80. As a result, a given preloading force is transferred to the contact surface 10c of the wall 80, and the intermediate gear 2 is stably supported in the axial direction Td of the shaft 4. The preloading force will be described below in detail.

The outer ring 3a of the bearing 3 is rotatably provided with respect to the inner ring 3b. In such a manner, the intermediate gear 2 is rotatably supported by the shaft 4, at two locations of the shaft receiving portion 2c of the intermediate gear 2 and the bearing 3, as illustrated in FIG. 6. Note that the shaft 4 is formed, for example, of stainless steel.

As illustrated in FIG. 6, each of the wall 70 and the wall 80 is an example of a holding portion to rotatably hold the intermediate gear 2 through the shaft 4. The wall 80 is integrally provided on the upper surface of the base 60, so as to form a pair with the wall 70, and extends from the upper surface of the base 60, toward the positive Z-axis direction. In the entire upper surface of the base 60, the wall 80 is provided in a plan view, in a region that is toward the second side 302 in the X-axis direction with respect to the middle portion of the base 60 and that is toward the third side 303 in the Y-axis direction with respect to the middle portion of the base 60. In the region described above, the wall 80 is also provided at a location near the second side 302 and is provided near the middle portion of the base 60 in the Y-axis direction. The wall 70, the wall 80, and the shaft 4 serve as a holding portion to rotatably hold the intermediate gear 2. The shaft 4 is a cylindrical member and has one end 4a and the other end 4b. The other end 4b of the shaft 4 is press-fitted into and secured to a hole 10b formed in the wall 80 of the main base 10. In contrast, the one end 4a of the shaft 4 is inserted into and positioned in a hole 10a formed in the wall 70. It is not necessary for the other end 4a of the shaft 4 to be pressed-fitted into the hole 10a. As described above, the one end 4a of the shaft 4 is inserted into the hole 10a without being press-fitted into the hole 10a, thereby facilitating assembly of the shaft 4, in comparison to a case where the one end 4a of the shaft 4 is pressed-fitted into the hole 10a.

As illustrated in FIG. 5 and the like, in the absolute encoder 100, the layshaft gear 5 is provided on the side opposite the main spindle gear 1 with respect to the intermediate gear 2. For example, the layshaft gear 5 is disposed in a region near a given corner of the main base 10, in a region surrounded by the four sides of the main base 10. The given corner is, for example, a portion at which the second side 302 and the third side 303, as illustrated in FIG. 5, meet. In such a manner, the layshaft gear 5 and the main spindle gear 1 utilizes a limited region of the main base 10 to be arranged in a manner of sandwiching the intermediate gear 2. Thus, in comparison to a case where the layshaft gear 5 and the main spindle gear 1 are disposed adjacent to each other without sandwiching the intermediate gear 2, a distance from the layshaft gear 5 to the main spindle gear 1 can be increased.

The magnetic sensor 40 detects changes in magnetic flux that is induced through the permanent magnet 9 in accordance with rotation of the permanent magnet 9, which rotates together with the main spindle gear 1. In such a manner, the magnetic sensor 40 can detect a corresponding rotation angle of the main spindle gear 1. In contrast, the magnetic sensor 50 detects changes in magnetic flux that is induced through the permanent magnet 8 in accordance with rotation of the permanent magnet 8, which rotates together with the layshaft gear 5. In such a manner, the magnetic sensor 50 can detect a corresponding rotation angle of the layshaft gear 5.

Hereafter, magnetic interference will be described, where for example, if the main spindle gear 1 and the layshaft gear 5 are disposed adjacent to each other, a portion of magnetic flux induced through each of the permanent magnet 8 and the permanent magnet 9 might influence a magnetic sensor that does not correspond to a given permanent magnet among the permanent magnet 8 and the permanent magnet 9.

Figure 19:
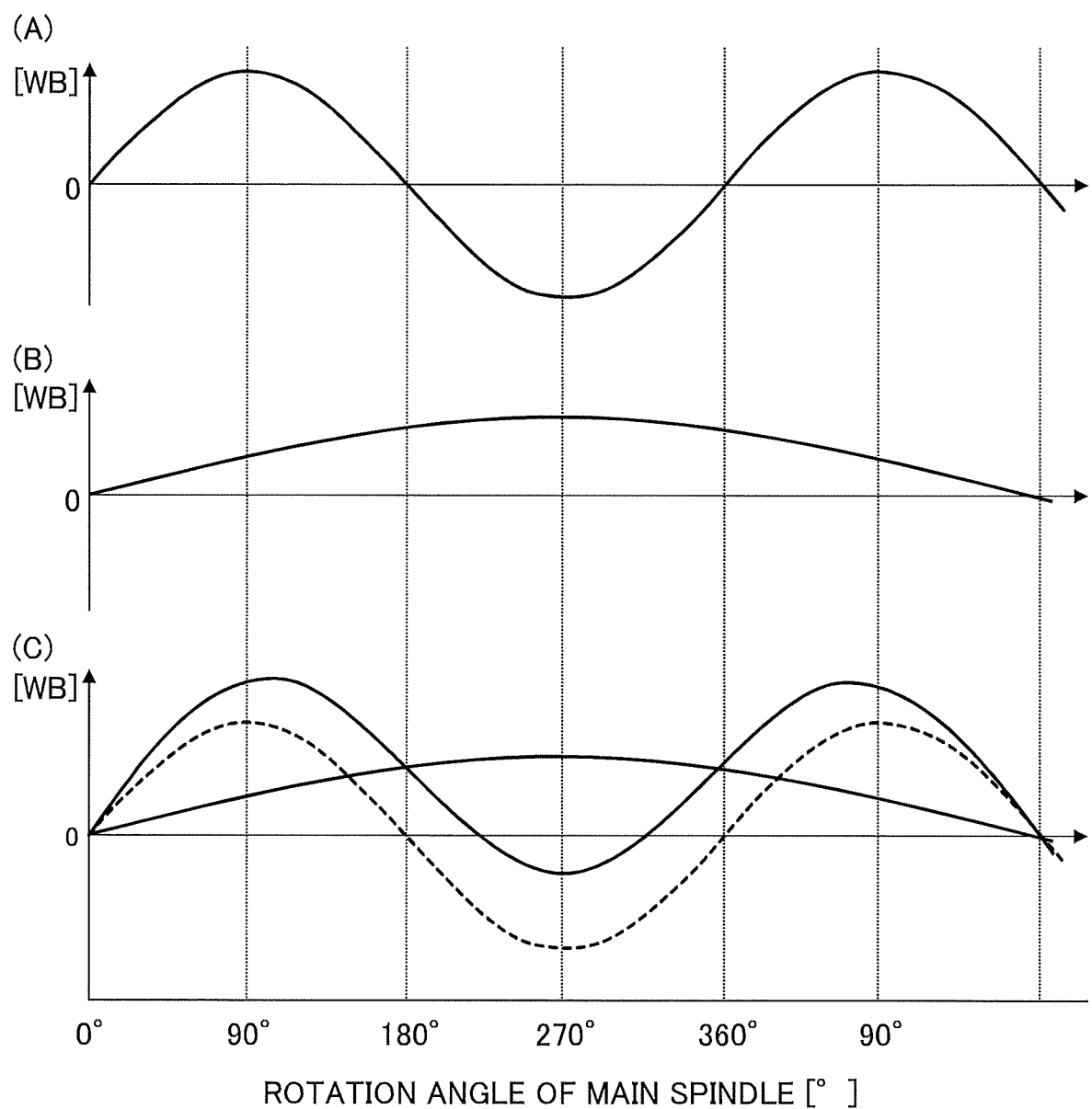
FIG. 19 is a diagram illustrating a manner of a waveform (A) of magnetic flux that is induced through the permanent magnet 9 provided with respect to the main spindle gear 1, a waveform (B) of magnetic flux that is induced through the permanent magnet 8 provided with respect to the layshaft gear 5, and a magnetically interfering waveform (C) produced when a portion of the magnetic flux induced through the permanent magnet 8 is superimposed, as leakage magnetic flux, on the magnetic flux induced through the permanent magnet 9.

FIG. 19 is a diagram illustrating the manner, when the main spindle gear 1 rotates, of a waveform (A) of magnetic flux that is induced through the permanent magnet 9 provided with respect to the main spindle gear 1, where the waveform is detected by the magnetic sensor 40, a waveform (B) of magnetic flux that is induced through the permanent magnet 8 provided with respect to the layshaft gear 5, where the waveform is detected by the magnetic sensor 50, and a magnetically interfering waveform (C) produced when the magnetic sensor 40 detects, as leakage magnetic flux, a portion of magnetic flux induced through the permanent magnet 8, while detecting magnetic flux induced through the permanent magnet 9, where the portion of the magnetic flux induced through the permanent magnet 8 is superimposed on the magnetic flux induced through the permanent magnet 9. The vertical axis represents the magnetic flux, and the horizontal axis represents the rotation angle of the main spindle gear 1. In such a manner, the magnetic sensor 40 desirably detects the waveform (A) above. However, if magnetic interference occurs, the waveform illustrated in (C) above is produced, and thus the waveform could not be detected accurately.

Figure 20:
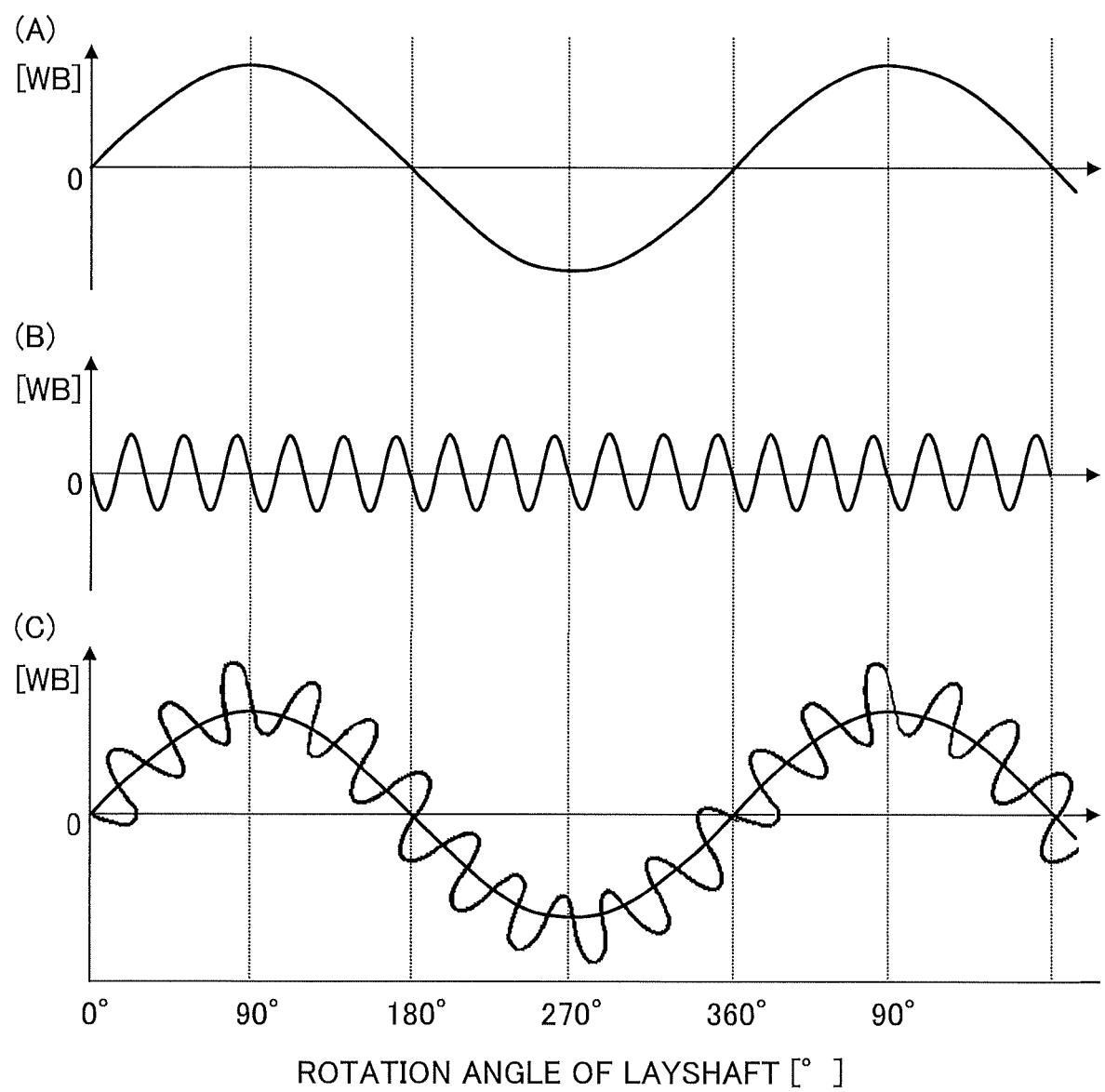
FIG. 20 is a diagram illustrating a manner of a waveform (A) of magnetic flux that is induced through the permanent magnet 8 provided with respect to the layshaft gear 5, a waveform (B) of magnetic flux that is induced through the permanent magnet 9 provided with respect to the main spindle gear 1, and a magnetically interfering waveform (C) produced when a portion of the magnetic flux induced through the permanent magnet 9 is superimposed, as leakage magnetic flux, on the magnetic flux induced through the permanent magnet 8.

Likewise, FIG. 20 is a diagram illustrating the manner, when the main spindle gear 1 rotates, of a waveform (A) of magnetic flux that is induced through the permanent magnet 8 provided with respect to the layshaft gear 5, where the waveform is detected by the magnetic sensor 50, a waveform (B) of magnetic flux that is induced through the permanent magnet 9 provided with respect to the main spindle gear 1, where the waveform is detected by the magnetic sensor 40, and a magnetically interfering waveform (C) produced when the magnetic sensor 50 detects, as leakage magnetic flux, a portion of magnetic flux induced through the permanent magnet 9, while detecting magnetic flux induced through the permanent magnet 8, where the portion of the magnetic flux induced through the permanent magnet 9 is superimposed on the magnetic flux induced through the permanent magnet 8. The vertical axis represents the magnetic flux, and the horizontal axis represents the rotation angle of the layshaft gear 5. In such a manner, the magnetic sensor 50 desirably detects the waveform (A) above. However, if magnetic interference occurs, the waveform illustrated in (C) above is produced, and thus the waveform could not be detected accurately.

Accordingly, in the absolute encoder 100 according to the present embodiment, the main spindle gear 1 and the permanent magnet 9 are each disposed at a distance from the layshaft gear 5 and the permanent magnet 8, such that the intermediate gear 2 is provided between a pair of the main spindle gear 1 and the permanent magnet 9 and a pair of the layshaft gear 5 and the permanent magnet 8. Thus, the occurrence of the magnetic interference, in which a portion of the magnetic flux induced through each of the permanent magnet 8 and the permanent magnet 9 influences a given magnetic sensor that does not correspond to a given permanent magnet among the permanent magnet 8 and the permanent magnet 9, can be reduced. For example, in the magnetic sensor 50, which is provided for primary purposes of detecting changes in magnetic flux that is induced through the permanent magnet 8 provided with respect to the layshaft gear 5, interference of a portion of magnetic flux to be induced, as leakage magnetic flux, through the permanent magnet 9 provided with respect to the main spindle gear 1 can be mitigated. Also, in the magnetic sensor 40, which is provided for primary purposes of detecting changes in magnetic flux that is induced through the permanent magnet 9, interference of a portion of magnetic flux to be induced, as leakage magnetic flux, through the permanent magnet 8 provided with respect to the layshaft gear 5 can be mitigated.

As described above, in the absolute encoder 100 according to the present embodiment, decreases in accuracy of the magnetic sensor 50 to detect the rotation angle or the rotation amount of the layshaft gear 5 can be prevented, as well as relatively reducing the size of the absolute encoder 100 in a plan view. Further, in the absolute encoder 100, decreases in accuracy of the magnetic sensor 40 to detect the rotation angle or the rotation amount of the main spindle gear 1 can be prevented, as well as relatively reducing the size of the absolute encoder 100 in a plan view.

As illustrated in FIG. 9, the layshaft gear 5 is a cylindrical member that is press-fitted into and secured to the shaft 6b of the magnet holder 6. The layshaft gear 5 includes the worm wheel 5a and a through-hole 5b. The layshaft gear 5 is a member integrally molded from metal or resin. In this description, the layshaft gear 5 is formed of a polyacetal resin, as an example.

The worm wheel 5a is a gear that engages with the worm gear 2b. The worm wheel 5a is an example of a second driven gear. The worm wheel 5a is configured with a plurality of teeth that are provided on the outer periphery of a given cylindrical portion of the layshaft gear 5. In FIG. 4, when the intermediate gear 2 rotates, a rotating force of the intermediate gear 2 is transferred to the layshaft gear 5 through the worm gear 2b and the worm wheel 5a.

The through-hole 5b is a hole through the cylindrical layshaft gear 5 along the central axis thereof. The shaft 6b of the magnet holder 6 is press-fitted into the through-hole 5b, and the layshaft gear 5 rotates together with the magnet holder 6.

As illustrated in FIG. 9, the magnet holder 6 includes the magnet holding portion 6a, the shaft 6b, and a head 6c. The magnet holder 6 is a member integrally molded from metal or resin. In this description, the magnet holder 6 is formed of non-magnetic stainless steel, as an example.

Outer rings 7a of the two bearings 7 are press-fitted into an inner peripheral surface 10dc of the bearing holder 10d formed in the main base 10. Note that each of the two bearings 7 has a given outer ring 7a and a given inner ring 7b.

The shaft 6b of the magnet holder 6 is a cylindrical member and is press-fitted into the through-hole 5b of the layshaft gear 5. A lower portion of the shaft 6b is inserted into the inner rings 7b of the two bearings 7. In such a manner, the magnet holder 6 is pivoted by the two bearings 7, with respect to the main base 10, and rotates together with the layshaft gear 5.

The head 6c is provided at the upper end of the magnet holder 6. The head 6c is a cylindrical member with a bottom. The magnet holding portion 6a is formed at the head 6c. The magnet holding portion 6a is a recessed portion to downwardly recess the upper end surface of the head 6c. The outer peripheral surface of the permanent magnet 8 disposed in the magnet holding portion 6a contacts the inner peripheral surface of the head 6c. Thus, the permanent magnet 8 is secured to the magnet holding portion 6a of the head 6c.

The shaft 6b of the magnet holder 6 is pivoted by the two bearings 7 disposed at the bearing holder 10d that is formed in the main base 10, and thus inclination of the magnet holder 6 can be prevented. In such a manner, if the two bearings 7 are disposed to the extent possible to be apart from each other in the axial direction of the shaft 6b, effects of preventing the inclination of the magnet holder 6 are obtained.

As illustrated in FIG. 9, an upper portion 10db of the bearing holder 10d is in an upper-side region of the bearing holder 10d in the Z-axis direction, in the entire bearing holder 10d. One bearing 7 is provided inside an upper portion 10db of the bearing holder 10d. A lower portion 10da of the bearing holder 10d is in a lower-side region of the bearing holder 10d in the Z-axis direction, in the entire bearing holder 10d. Another bearing 7 is provided inside the lower portion 10da of the bearing holder 10d.

As illustrated in FIG. 9, a cut-out portion 202a is provided in a portion of the housing 202 of the motor 200. The cut-out portion 202a is a recessed portion recessed toward the negative Z-axis direction. The lower portion 10da of the bearing holder 10d is provided to protrude, in the main base 10. In such a manner, by providing the cut-out portion 202a in the housing 202 of the motor 200, interference of the bearing holder 10d with the motor 200 is avoided. The lower portion 10da of the bearing holder 10d is in the lower-side region of the bearing holder 10d in the Z-axis direction, in the entire bearing holder 10d. The one bearing 7 is provided inside the lower portion 10da of the bearing holder 10d. In such a manner, by providing the cut-out portion 202a in the housing 202 of the motor 200, a longer distance between the two bearings 7 to be separated in the Z-axis direction can be set in comparison to a case where the cut-out portion 202a is not provided. The upper portion 10db of the bearing holder 10d is in the upper-side region of the bearing holder 10d in the Z-axis direction, in the entire bearing holder 10d.

When each bearing 7 is disposed in the axial direction of the shaft 6b of the magnet holder 6, at a location closer to the magnet holding portion 6a and the permanent magnet 8, shaft deflection can be reduced during rotation of the magnet holder 6 and the permanent magnet 8. Further, the outer diameter side of the upper portion 10db of the bearing holder 10d is proximal to the intermediate gear 2. Thus, when a slope is formed on the upper portion 10db of the bearing holder 10d, interference with an addendum circle of the intermediate gear 2 is avoided, while each bearing 7 can be provided at a location closer to the magnet holding portion 6a and the permanent magnet 8.

By detecting changes in magnetic flux that is induced through the permanent magnet 9 in accordance with rotation of the permanent magnet 9, which rotates together with the main spindle gear 1, the magnetic sensor 40 can detect a corresponding rotation angle of the main spindle gear 1. By detecting changes in magnetic flux that is induced through the permanent magnet 8 in accordance with rotation of the permanent magnet 8, which rotates together with the layshaft gear 5, the magnetic sensor 50 can detect a corresponding rotation angle of the layshaft gear 5.

As illustrated in FIG. 9 and FIG. 17, the permanent magnet 8 has a surface 8a. The permanent magnet 8 is generally cylindrical, and a central axis MC1 (an axis representing the center of the permanent magnet 8, or an axis through the center of an interface between magnetic poles) of the permanent magnet 8 coincides with each of a central axis HC1 of the magnet holder 6, a central axis GC1 of the layshaft gear 5, and a central axis BC of the bearing 7. The surface 8a of the permanent magnet 8 faces the surface 50a of the magnetic sensor 50, at a fixed distance from the surface 50a of the magnetic sensor 50. By matching the central axes in such a manner, a given rotation angle or rotation amount can be detected with higher accuracy.

Note that in the present embodiment, as illustrated in FIG. 17, two magnetic poles (N/S) of the permanent magnet 8 are formed adjacent to each other at a plane (X-Y plane) perpendicular to the central axis MC1 of the permanent magnet 8. In other words, in the central axis MC1, the center of rotation of the permanent magnet 8 desirably coincides with the center of the interface between the magnetic poles. Thus, accuracy for detecting a given rotation angle or rotation amount can be further improved.

As illustrated in FIG. 8 and FIG. 18, the permanent magnet 9 is a generally cylindrical permanent magnet that is press-fitted into the magnet holding portion 1h of the main spindle gear 1, and has the upper surface 9a and a lower surface 9b. The upper surface 9a of the magnet faces a surface 40a of the magnetic sensor 40, at a fixed distance from the surface 40a of the magnetic sensor 40. The lower surface 9b of the magnet contacts the bottom 1g of the magnet holding portion 1h of the main spindle gear 1, and with the lower surface 9b of the magnet, a location (location in the Z-axis direction) of the main spindle gear 1 in a central axis GC2-direction is determined. The central axis MC2 (an axis representing the center of the permanent magnet 9 or an axis through the center of an interface between magnetic poles) of the permanent magnet 9 coincides with each of the central axis GC2 of the main spindle gear 1 and a central axis RC of the motor shaft 201. By matching the central axes in such a manner, the rotation angle or rotation amount can be detected with higher accuracy.

Note that in the present embodiment, two magnetic poles (N/S) of the permanent magnet 9 are formed adjacent to each other at a plane (X-Y plane) perpendicular to the central axis MC2 of the permanent magnet 9. Thus, accuracy for detecting a given rotation angle or rotation amount can be further improved.

Note that each of the permanent magnet 8 and the permanent magnet 9 is formed of a magnetic material such as a ferrite-type or Nd (neodymium)-Fe (iron)-B (boron). Each of the permanent magnet 8 and the permanent magnet 9 may be, for example, a rubber magnet including a resin binder, a bond magnet, or the like.

In FIG. 13, a positioning hole 20a, a positioning hole 20b, a hole 20c, a hole 20d, and a hole 20e, which are multiple through-holes formed in the substrate 20, are illustrated. The shape of a wall surface forming the positioning hole 20a is a circle, for example. The shape of a wall surface forming the positioning hole 20b is an ellipse, for example. Each of the hole 20c, the hole 20d, and the hole 20e is a through-hole for securing the substrate 20 to the main base 10 with the substrate-mounting screws 13, as illustrated in FIG. 2. The shape of the wall surface forming each of the hole 20c, the hole 20d, and the hole 20e is a circle, for example. The diameter of the wall surface forming each of the hole 20c, the hole 20d, and the hole 20e is greater than a diameter of an external thread of each substrate-mounting screw 13 and is smaller than a diameter of a head of each substrate-mounting screw 13.

As illustrated in FIGS. 3 to 6, FIGS. 10 to 12, and the like, the main base 10 includes the hole 10a, the hole 10b, the contact surface 10c, the bearing holder 10d, a leaf-spring mounting surface 10e, the base 60, the wall 70, the wall 80, an opening 10-1, and a screw hole 10f. The main base 10 includes the substrate positioning pin 10g, the substrate positioning pin 10j, a tip 10h, a tip 10k, a pillar 10m, a pillar 10q, a pillar 10s, a screw hole 10u, a screw hole 10v, and a screw hole 10w. The substrate positioning pin 10g, the substrate positioning pin 10j, the pillar 10m, the pillar 10q, and the pillar 10s are examples of pillar members. A stepped portion 10i is formed between the tip 10h of the substrate positioning pin 10g, which extends in the Z-axis direction from the main base 10, and a base 10g1 of the substrate positioning pin 10g. When the tip 10h of the substrate positioning pin 10g is inserted into the positioning hole 20a formed in the substrate 20, a space is formed between the lower surface 20-1 of the substrate 20 and the stepped portion 10i. Likewise, a stepped portion 10l is formed between the tip 10k of the substrate positioning pin 10j, which extends in the Z-axis direction from the main base 10, and a base 10j1 of the substrate positioning pin 10j. When the tip 10k of the substrate positioning pin 10j is inserted into the positioning hole 20b formed in the substrate 20, a space is formed between the lower surface 20-1 of the substrate 20 and the stepped portion 10l. In such a manner, when the two substrate positioning pins 10g and 10l are used, the location of the substrate 20 in the direction perpendicular to the Z-axis direction is determined. However, because a given space is formed between each of the stepped portion 10i and the stepped portion 10*l*, and the substrate 20, the location of the substrate 20 in the Z-axis direction is not determined by the two substrate positioning pins 10*g* and 10*j*.

The base 60 of the main base 10 is, for example, an integrally molded aluminum die cast member, and is a plate-shaped member that is generally square in a plan view. The base 60 is an example of a plate. The base 60 is mounted on the upper surface of the motor 200.

The opening 10-1 illustrated in FIG. 3 passes through the base 60 in a thickness direction (Z-axis direction). The main spindle gear 1 is inserted through the opening 10-1. The opening 10-1 is an example of a first through-hole.

As illustrated in FIG. 4, FIG. 5, FIG. 10, and FIG. 11, and the like, the wall 70 has a wall 71 and a wall 72. The wall 70 serves to support the shaft 4 and secure the leaf spring 11. The wall 71 is integrally provided on the upper surface of the base 60 and extends in the positive Z-axis direction from the base 60. The wall 70 is provided in a plan view in a region that is toward the first side 301 with respect to the middle portion of the base 60 in the X-axis direction and that is toward the fourth side 304 with respect to the middle portion of the base 60 in the Y-axis direction, in the entire upper surface of the base 60. The wall 71 has a mounting surface 10*ad* positioned toward the positive X-axis direction, and has a screw hole 10*ae* through the wall 71 in the positive X-axis direction. As illustrated in FIG. 1, FIG. 14, and FIG. 15, the mounted screw 16 is inserted through a hole 15*d* of the case 15 to be screwed into the screw hole 10*ae*. Thus, the inner surface of the case 15 is secured by contact with the mounting surface 10*ad* of the wall 71.

As illustrated in FIG. 5, the wall 72 is provided in a plan view, in a region that is toward the first side 301 with respect to the middle portion of the base 60 in the X-axis direction and that is toward the third side 303 with respect to the middle portion of the base 60 in the Y-axis direction, in the entire upper surface of the base 60. The wall 72 is connected to the wall 71 and extends from the wall toward the proximity of the middle portion of the third side 303. An end portion of the wall 72 toward the third side 303 is connected to the pillar 10*s*. The pillar 10*s* connected to the wall 72 is provided at a location near the middle portion of the main base 10 in the X-axis direction, as well as being situated at a location near the third side 303 of the main base 10. In such a manner, the wall 72 extends from the wall 71 toward the pillar 10*s*. In other words, the wall 72 extends obliquely with respect to each of the X-axis and Y-axis, in a plan view.

As illustrated in FIG. 11, the screw 12 is inserted through a hole 11*c* formed in the mounting portion 11*b* of the leaf spring 11, and is screwed into a screw hole 10*f* formed in the wall 72 of the main base 10. In such a manner, the mounting portion 11*b* of the leaf spring 11 contacts the leaf-spring mounting surface 10*e* formed in the wall 72, and the leaf spring 11 is thereby secured to the wall 72. The wall 72 serves as a securing portion for the leaf spring 11 to be secured. At this time, as illustrated in FIG. 5 and FIG. 6, the sliding portion 11*a* of the leaf spring 11 contacts the sliding portion 2*e* of the intermediate gear 2 into which the shaft 4 is inserted.

A mounting angle θ as illustrated in FIG. 6 will be described. The worm gear 1*d* of the main spindle gear 1 is engaged with the worm wheel 2*a*, and in accordance with rotation of the worm gear 1*d* of the main spindle gear 1, a first thrust force against the intermediate gear 2 is generated in the direction from the other end 4*b* of the shaft 4 to one end 4*a* of the shaft 4, or the direction from one end 4*a* of the shaft 4 to the other end 4*b* of the shaft 4. Further, by engagement of the worm gear 2*b* with the worm wheel 5*a* of the layshaft gear 5, a second thrust force against the intermediate gear 2 is also generated in the direction from the other end 4*b* of the shaft 4 toward one end 4*a* of the shaft 4, or the direction from one end 4*a* of the shaft 4 toward the other end 4*b* of the shaft 4. In such a manner, even when the first thrust force and the second thrust force are generated, in order to accurately transmit a rotation amount of the worm gear 1*d* of the main spindle gear 1 to the worm wheel 5*a* of the layshaft gear 5, movement of the intermediate gear 2 in the axial direction Td of the shaft 4 needs to be restricted. The leaf spring 11 applies a preloading force to the intermediate gear 2, in the direction from one end 4*a* of the shaft 4 toward the other end 4*b* of the shaft 4. A greater preloading force applied by the leaf spring 11 is set in comparison to the sum of the first thrust force and second thrust force in the direction from the other end 4*b* of the shaft 4 toward one end 4*a* of the shaft 4.

In FIG. 6, in a state where the intermediate gear 2 is not inserted into the shaft 4, the mounting angle θ is the same as an angle between the base 11*d* of the leaf spring 11, which is secured to the wall 72 of the main base 10, and the side surface 73 of the wall 72 that is toward the intermediate gear 2 and that is among surfaces of the wall 72, where the hole 10*a* through which the one end 4*a* of the shaft 4 is inserted is formed at the surfaces of the wall 72. Note that the side surface 73 and the shaft 4 according to the present embodiment are set at a right angle, but may not be limited to the example described above. When the intermediate gear 2 is incorporated into the shaft 4, the sliding portion 11*a* of the leaf spring 11 comes into contact with the sliding portion 2*e* of the intermediate gear 2, and thus the leaf spring 11 is deflected at a predetermined amount. In such a manner, the mounting angle θ is set to be an angle that causes a force to preload the intermediate gear 2 to be appropriately applied in the axial direction Td of the shaft 4. Thus, the leaf spring 11 preloads the intermediate gear 2 in a given direction from the one end 4*a* of the shaft 4 to the other end 4*b* of the shaft 4. Accordingly, movement of the intermediate gear 2 due to a total force for the first thrust force and the second thrust force in the direction from the other end 4*b* of the shaft 4 to the one end 4*a* of the shaft 4 can be restricted. As a result, decreases in rotation accuracy of the layshaft gear 5 can be avoided. Note that the increased preloading force results in an increase in sliding resistance while the intermediate gear 2 illustrated in FIG. 6 is rotating. For this reason, the mounting angle θ is desirably set to an appropriate value that causes a sufficient preloading force allowing restriction of the movement of the intermediate gear 2 through a given thrust force, as well as minimizing the sliding resistance during rotation of the intermediate gear 2. In order to set the mounting angle θ to such an appropriate value, it is necessary to increase surface accuracy of the leaf-spring mounting surface 10*e* on which the leaf spring 11 is mounted, and to reduce an error of the mounting angle of the base 60 relative to the wall 70.

In the absolute encoder 100 according to the present embodiment, the main base 10 is formed from die-cast aluminum, and for example, a smaller error margin of the mounting angle of the wall 70 relative to the base 60 can be set in comparison to a case where an individually fabricated base 60 and the wall 70 are combined with each other by sheet metal. Thus, surface accuracy of the leaf-spring mounting surface 10*e* can be increased. As a result, the error margin of the mounting angle θ of the wall 72 relative to the leaf spring 11 is decreased and thus the control of the preloading force is facilitated.

As illustrated in FIG. 10, the main base 10 is secured with three screws 14 that are inserted through three holes formed in the main base 10 and that are screwed into screw holes formed in the motor 200. A screw hole 10v, a screw hole 10u, and a screw hole 10w are respectively formed in the positive Z-axis direction, on tip sides of the pillar 10q, the pillar 10m, and the pillar 10s each of which extends from the main base 10 in the positive Z-axis direction. The respective substrate mounting screws 13 inserted into the hole 20c, the hole 20e, and the hole 20d in the substrate 20, as illustrated in FIG. 2, are screwed into the screw hole 10v, the screw hole 10u, and the screw hole 10w. In such a manner, an upper end surface 10r of the pillar 10q, an upper end surface 10p of the pillar 10m, and an upper end surface 10t of the pillar 10s contact the lower surface 20-1 of the substrate 20 as illustrated in FIG. 12. The lower surface 20-1 of the substrate 20 is a surface that faces the main base 10 and that is among two substrate surfaces of the substrate 20 in the Z-axis direction. As a result, the location of the substrate 20 in the Z-axis direction is determined.

As illustrated in FIG. 1, FIGS. 14 to 16, and the like, the case 15 has a top portion 15-1, a first side portion 15A, a second side portion 15B, a third side portion 15C, and a fourth side portion 15D, and is a box-shaped member of which one side is open. For example, the case 15 is made of resin and is a integrally molded member. The top portion 15-1 corresponds to a bottom of a given box-shaped member. The top portion 15-1 has a surface facing the upper surface 20-2 of the substrate 20 illustrated in FIG. 2. The upper surface 20-2 of the substrate 20 is a substrate surface opposite the lower surface 20-1 of the substrate 20. The first side portion 15A is a plate-shaped member extending from a given side of the top portion 15-1 in the positive X-axis direction, toward the negative Z-axis direction. The second side portion 15B is a plate-shaped member extending from a given side of the top portion 15-1 in the negative X-axis direction, toward the negative Z-axis direction. The third side portion 15C is a plate-shaped member extending from a given side of the top portion 15-1 in the negative Y-axis direction, toward the negative Z-axis direction. The fourth side portion 15D is a plate-shaped member extending from a given side of the top portion 15-1 in the positive Y-axis direction, toward the negative Z-axis direction. The shape of the case 15 in a plan view is a rectangular shape corresponding to the shape of the motor 200 in a plan view. A plurality of components provided in the absolute encoder 100 are accommodated in a given space in the case 15.

As illustrated in FIG. 15, the case 15 includes a tab 15a, a tab 15b, a tab 15c, a hole 15d, a recessed portion 15e, a recessed portion 15f, a recessed portion 15g, a connector case 15h, and an opening 15i. The tab 15a is provided near an end portion of the fourth side portion 15D in the negative Z-axis direction. The tab 15a extends from the fourth side portion 15D toward the negative Y-axis direction so as to face the third side portion 15C. The tab 15a is engaged with the recessed portion 10aa provided in the main base 10, as illustrated in FIG. 14. The tab 15b is provided near an end portion of the third side portion 15C in the negative Z-axis direction. The tab 15b extends from the third side portion 15C toward the positive Y-axis direction so as to face the fourth side portion 15D. The tab 15b is engaged with a recessed portion 10ab provided in the main base 10, as illustrated in FIG. 14. The tab 15c is provided near an end portion of the second side portion 15B in the negative Z-axis direction. The tab 15c extends from the second side portion 15B toward the negative X-axis direction so as to face the first side portion 15A. The tab 15c is engaged with a recessed portion 10ac provided in the main base 10, as illustrated in FIG. 14.

The recessed portion 15e, the recessed portion 15f, and the recessed portion 15g, as illustrated in FIG. 15, are recessed portions each of which recesses a portion of a top 5-1 of the case 15 toward the positive Z-axis direction, in order to avoid interference with a head of a given substrate mounting screw among the three substrate mounting screws 13 illustrated in FIG. 2.

The connector case 15h is a recessed portion to recess a portion of the top 5-1 of the case 15 toward the positive Z-axis direction, in order to cover the connector 24 illustrated in FIG. 2. The bottom shape of the connector case 15h is rectangular in a plan view. The connector case 15h is provided in a given region that is toward the first side portion 15A with respect to a middle portion of the top 15-1 in the X-axis direction and that is proximal to the middle portion of the top 15-1 in the Y-axis direction, in the top 15-1 of the case. The connector case 15h is provided at a portion near the first side portion 15A, in the given region described above.

The opening 15i is formed between the bottom of the connector case 15h and the first side portion 15A. The connector 24 illustrated in FIG. 2 is disposed so as to face the bottom of the connector case 15h. The connector 24 is, for example, an internal connector, and an external connector provided for one end of an external wire is inserted into the connector 24. The external connector is inserted into the connector 24 disposed in the connector case 15h, through the opening 15i illustrated in FIG. 15. In such a manner, a conductive terminal of the internal connector provided for one end of the external wire is electrically connected to a conductive terminal provided at the connector 24. As a result, an external device connected to the other end of the external wire, and the connector 24 are electrically connected together and thus signals can be transmitted between the absolute encoder 100 and the external device.

Further, the connector case 15h is provided at a location near the first side portion 15A, and the location of the connector 24 in a plan view corresponds to the location of a connector 400 set when the motor 200 is viewed from a given plane, as illustrated in FIG. 2. By configuring the absolute encoder 100 in such a manner, a drawn location of the external wire to be electrically connected to a given conductive pin provided at the connector 24 can become closer to a drawn location of the external wire to be electrically connected to a given conductive pin provided at the connector 400. Thus, these external wires can be bundled together near each of the absolute encoder 100 and the motor 200, thereby causing the resulting bundled wires to be easily drawn to a given external device.

As illustrated in FIG. 13, the magnetic sensor 40, the magnetic sensor 50, a microcomputer 21, a bidirectional driver 22, and a line driver 23 are provided on the lower surface 20-1 of the substrate 20. The lower surface 20-1 of the substrate 20 is a mounting surface for the magnetic sensor 40 and the magnetic sensor 50. As described above, the lower surface 20-1 of the substrate 20 contacts an upper end surface 10r of the pillar 10q, an upper end surface 10p of the pillar 10m, and an upper end surface 10t of the pillar 10s. As illustrated in FIG. 4, the pillar 10q, the pillar 10m, and the pillar 10s are provided on the main base 10 such that a difference in a separation distance between given pillars is decreased when the main base 10 is viewed from a given plane. For example, the pillar 10q is provided near the second side 302, in the proximity of the middle portion of the main base 10 in the Y-axis direction. The pillar 10q is integral with the wall 80. The pillar 10m is provided near a corner at which the first side 301 and the fourth side 304 meet. The pillar 10s is provided near the third side 303 in the proximity of the middle portion of the main base 10 in the X-axis direction. The pillar 10s is integrated with the wall 70 and the substrate positioning pin 10g. In such a manner, by providing the pillar 10q, the pillar 10m, and the pillar 10s, the locations, in the Z-axis direction, of the magnetic sensor 40 and the magnetic sensor 50 provided on the substrate 20 can be determined accurately. Note that when the pillar 10q, the pillar 10m, and the pillar 10s are each formed in the X-Y plane direction at a location of the main base 10 to the extent possible to be away from other pillars, the location of the substrate 20 can be maintained more stably.

In the absolute encoder 100 according to the present embodiment, the main base 10 is formed by die-casting. In such a manner, positional accuracy between given components is improved in comparison to a case where the base 60 of the main base 10 is fabricated by, for example, sheet metal, and then, the pillar 10q, the pillar 10m, the pillar 10s, the substrate positioning pin 10g, the substrate positioning pin 10j, the wall 70, the wall 80, and the like are individually fabricated to subsequently assemble such components. Further, the number of components to be used during manufacture is reduced, and thus the structure of the absolute encoder 100 can be simplified. Moreover, a manufacturing time can be reduced due to ease of assembly, thereby allowing for increased reliability of the absolute encoder 100.

The magnetic sensor 40 is an example of a main spindle angular sensor. The magnetic sensor 40 is positioned directly above the permanent magnet 9, at a predetermined distance from the permanent magnet 9. By detecting changes in magnetic flux induced through the permanent magnet 9 in accordance with rotation of the permanent magnet 9, which rotates together with the main spindle gear 1, the magnetic sensor 40 detects and determines a corresponding rotation angle of the main spindle gear 1, and then outputs, as a digital signal, angle information indicating the determined rotation angle.

The magnetic sensor 50 is an example of an angular sensor. The layshaft gear 5 is a rotating body that rotates in accordance with rotation of the worm wheel 5a, which is a second driven gear. The magnetic sensor 50 is positioned directly above the permanent magnet 8, at a predetermined distance from the permanent magnet 8. By detecting changes in magnetic flux induced through the permanent magnet 8 in accordance with rotation of the permanent magnet 8, which rotates together with the layshaft gear 5, the magnetic sensor 50 detects and determines a given rotation angle of the layshaft gear 5, and then outputs, as a digital signal, angle information indicating the determined rotation angle.

For example, each of the magnetic sensor 40 and the magnetic sensor 50 includes a sensing element to detect changes in magnetic flux, and an arithmetic circuit to output a digital signal indicating a rotation angle, based on the output of the sensing element. The example of the sensing element may be a combination of elements for sensing a magnetic field, such as a Hall element and a giant magneto resistive (GMR) element. The number of elements for sensing a magnetic field is, for example, four.

When the number of threads of the worm gear 1d of the main spindle gear 1 is 4, and the number of teeth of the worm wheel 2a of the intermediate gear 2 is 20, a deceleration ratio is 5. That is, when the main spindle gear 1 rotates 5 revolutions, the intermediate gear 2 rotates one revolution. When the number of threads of the worm gear 2b of the intermediate gear 2 is 1, and the number of teeth of the worm wheel 5a of the layshaft gear 5 is 18, a deceleration ratio is 18. That is, when the intermediate gear 2 rotates 18 revolutions, the layshaft gear 5 rotates one revolution. In such a manner, when the main spindle gear 1 rotates 90 revolutions, the intermediate gear 2 rotates 18 revolutions, which is given by 90÷5, and the layshaft gear 5 rotates one revolution, which is given by 18÷18.

The permanent magnets 9 and 8 are respectively provided with respect to the main spindle gear 1 and the layshaft gear 5 each of which rotates together with a given permanent magnet among the permanent magnets 9 and 8. In such a manner, each of the magnetic sensor 40 and the magnetic sensor 50, corresponding to a given gear, detects a given rotation angle of the given gear among the main spindle gear 1 and the layshaft gear 5, and a rotation amount of the motor shaft 201 can be thereby determined. When the main spindle gear 1 rotates one revolution, the layshaft gear 5 rotates one ninetieth of one revolution, that is, at 4 degrees. In this case, when the rotation angle of the layshaft gear 5 is less than 4 degrees, a rotation amount of the main spindle gear 1 is less than one revolution, and when the rotation angle of the layshaft gear 5 is 4 degrees or more and is less than 8 degrees, the rotation amount of the main spindle gear 1 is one revolution or more and is less than 2 revolutions. In such a manner, the absolute encoder 100 can determine a rotation speed of the main spindle gear 1 in accordance with the rotation angle of the layshaft gear 5. In particular, the absolute encoder 100 can utilize a reduction ratio between the worm gear 1d and the worm wheel 2a, as well as a reduction ratio between the worm gear 2b and the worm wheel 5a, to determine the rotation speed of the main spindle gear 1 even when the rotation speed of the main spindle gear 1 is defined by a plurality of revolutions.

The microcomputer 21, the bidirectional driver 22, the line driver 23, and the connector 24 are mounted on the substrate 20. The microcomputer 21, the bidirectional driver 22, the line driver 23, and the connector 24 are electrically connected together by pattern wiring on the substrate 20.

The microcomputer 21 is configured by a central processing unit (CPU), acquires a digital signal indicating a given rotation angle to be output from each of the magnetic sensor 40 and the magnetic sensor 50, and calculates a given rotation amount of the main spindle gear 1.

The bidirectional driver 22 performs bidirectional communication with an external device to be connected to the connector 24. The bidirectional driver 22 converts data such as an operation signal, into a differential signal to thereby perform communication with the external device. The line driver 23 converts data indicating a given rotational amount into a differential signal, and outputs the differential signal in real time to the external device connected to the connector 24. A given connector of the external device is connected to the connector 24.

Figure 21:
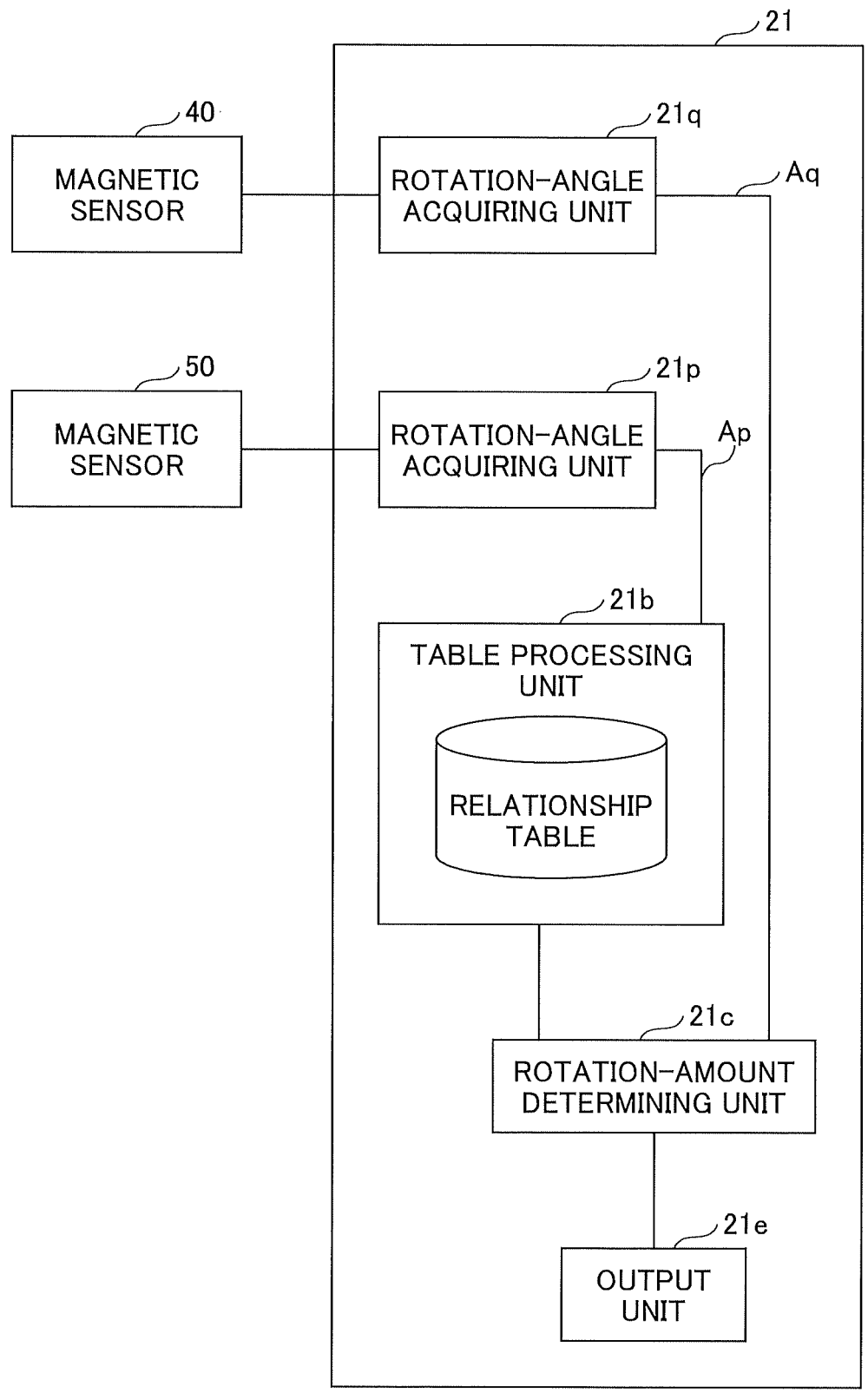
FIG. 21 is a diagram illustrating a functional configuration of a microcomputer 21.

FIG. 21 is a diagram illustrating a functional configuration of the microcomputer 21. Each block of the microcomputer 21 illustrated in FIG. 21 represents a function implemented when the CPU as the microcomputer 21 executes a program.

The microcomputer 21 includes a rotation-angle acquiring unit 21p, a rotation-angle acquiring unit 21q, a table processing unit 21b, a rotation-amount determining unit 21c, and an output unit 21e. The rotation-angle acquiring unit 21q acquires a rotation angle Aq of the main spindle gear 1 based on a signal output from the magnetic sensor 40. The rotation angle Aq corresponds to angle information indicating a given rotation angle of the main spindle gear 1. The rotation-angle acquiring unit 21p acquires a rotation angle Ap of the layshaft gear 5 based on a signal output from the magnetic sensor 50. The rotation angle Ap corresponds to angle information indicating a given rotation angle of the layshaft gear 5. The table processing unit 21b determines a rotation speed of the main spindle gear 1 corresponding to the acquired rotation angle Ap, with reference to a relationship table that stores the rotation angle Ap and the rotation speed of the main spindle gear 1 associated with the rotation angle Ap. The rotation-amount determining unit 21c determines a rotation amount corresponding to a plurality of revolutions of the main spindle gear 1, based on the rotation speed of the main spindle gear 1 determined by the table processing unit 21b, as well as on the acquired rotation angle Aq. The output unit 21e converts the determined rotation amount corresponding to the plurality of revolutions of the main spindle gear 1, into information indicating the determined rotation amount, and outputs the information.

As described above, in the absolute encoder 100 according to the present embodiment, the layshaft gear 5 is provided on the side opposite the main spindle gear 1 with respect to the intermediate gear 2, as illustrated in FIG. 5 and the like, and thus occurrence of magnetic interference to influence a given magnetic sensor not corresponding to a given permanent magnet among the permanent magnet 8 and the permanent magnet 9 can be reduced. In such a manner, by employing a structure capable of reducing the occurrence of the magnetic interference, a relatively reduced size of the absolute encoder 100 can be set when the absolute encoder 100 is viewed from a plane. Accordingly, the size of the absolute encoder 100 is reduced, as well as allowing for prevention of decreases in accuracy of each of the magnetic sensor 40 and the magnetic sensor 50 to detect magnetic flux.

Further, in the absolute encoder 100 according to the present embodiment, the intermediate gear 2 disposed parallel to the upper surface of the main base 10 extends obliquely with respect to each of the four sides of the main base 10, and further, the main spindle gear 1 and the layshaft gear 5 are disposed on opposed sides with respect to the intermediate gear 2. In such a manner, the main spindle gear the intermediate gear 2, and the layshaft gear 5 can be disposed in a small region being a portion of the entire region of the upper surface of the main base 10, thereby reducing the dimensions of the absolute encoder 100 with respect to the horizontal direction.

Further, in the absolute encoder 100 according to the present embodiment, the outer diameter of the worm wheel 2a and the outer diameter of the worm gear 2b are each set to a value to the minimum extent possible. Thus, the dimension of the absolute encoder 100 with respect to the Z-axis direction (height direction) can be reduced.

As described above, the absolute encoder 100 according to the present embodiment has the effect of reducing the dimension with respect to the Z-axis direction, as well as the dimensions with respect to the directions perpendicular to the Z-axis direction, while preventing the decrease in detection accuracy of a given rotation amount of the main spindle gear 1.

Moreover, in the absolute encoder 100 according to the present embodiment, the intermediate gear 2 is pivoted with respect to the shaft 4 that is secured to the wall 80 and that is inserted into the wall 72. In other words, the intermediate gear 2 is rotatably supported with respect to the shaft 4. However, as long as the intermediate gear 2 can be pivoted, a method of supporting the intermediate gear 2 is not limited to the example described above.

For example, the absolute encoder 100 is configured such that one end 4a of the shaft 4 is inserted into the hole 10a formed in the wall 72 and the other end 4b of the shaft 4 is press-fitted into the hole 10b formed in the wall 80. Further, the absolute encoder 100 may be configured such that the outer ring 3a of the bearing 3 is press-fitted into and secured to the press-fit portion 2d formed in the intermediate gear 2 and the shaft 4 is press-fitted to and secured to the inner ring 3b of the bearing 3. In such a manner, the movement of the intermediate gear 2 secured to the shaft 4 in the axial direction Td is restricted. Even when the absolute encoder 100 is configured as described above, the intermediate gear 2 is rotatably supported by the shaft 4. Further, the wall 72 and the wall 80 restrict the movement of the shaft 4 in the axial direction Td, and the inner ring 3b of the bearing 3 secured to the shaft 4 also restricts the movement of the intermediate gear 2 in the axial direction Td. Accordingly, the use of the leaf spring is not applied.

Alternatively, for example, without using the bearing 3 illustrated in FIG. 6, the absolute encoder 100 may be configured such that in a secured state of the intermediate gear 2 to the shaft 4, the shaft 4 is rotatably supported by a bearing not illustrated, where the bearing is provided with respect to at least one among the wall 72 and the wall 80.

When an outer ring of a given bearing not illustrated is secured to the wall 72 or the wall 80, and one end 4a or the other end 4b of the shaft 4 is inserted into an inner ring of the given bearing, the intermediate gear 2 is secured to the shaft 4 and the shaft 4 is pivoted by the given bearing not illustrated. Thus, the shaft 4 and the intermediate gear 2 can rotate together. In this case, the shaft 4 is not secured to the inner ring of the bearing and is only inserted into the inner ring thereof, and thus the shaft 4 can be moved in the axial direction Td, together with the intermediate gear 2. Accordingly, the leaf spring 11 needs to preload the intermediate gear 2 in the axial direction Td to thereby determine a given location of the intermediate gear 2.

Alternatively, the outer ring of a given bearing not illustrated is secured to the wall 72 or the wall 80, and one end 4a or the other end 4b of shaft 4 may be press-fitted into the inner ring of the given bearing not illustrated. At this time, the movement of the intermediate gear 2 secured to the shaft 4 is restricted in the axial direction Td. In such a manner, the intermediate gear 2 secured to the shaft 4 is only supported rotatably by the given bearing not illustrated, and the movement of the shaft 4 in the axial direction Td is restricted. Thus, the movement of the intermediate gear 2 in the axial direction Td is restricted. Accordingly, the use of the leaf spring 11 is not applied.

Note that as illustrated in FIG. 8, a diameter D of the worm wheel 2a, which is a first driven gear, is less than or equal to an axial height H of the worm gear 1d, which is a first drive gear.

Note that the configuration illustrated in one or more embodiments described above is an example of the present invention. The configuration can be combined with another known technique. Alternatively, a portion of the configuration can be omitted or changed without departing from a spirit of the present invention.

This International Application claims priority to the Japanese Patent Application 2018-225877, filed Nov. 30, 2018, the contents of which are incorporated herein by reference in their entirety.

REFERENCE SIGNS LIST 1 main spindle gear, 1a first cylindrical portion, 1b second cylindrical portion, 1c communicating portion, 1d worm gear, 1e bottom, 1f press-fit portion, 1g bottom, 1h magnet holding portion, 2 intermediate gear, 2a worm wheel, 2b worm gear, 2c shaft receiving portion, 2d press-fit portion, 2e sliding portion, 2f bottom, 2g through-hole, 3 bearing, 3a outer ring, 3b inner ring, 3c side surface, 3d side surface, 4 shaft, 4a one end, 4b the other end, 5 layshaft gear, 5-1 top, 5a worm wheel, 5b through-hole, 6 magnet holder, 6a magnet holding portion, 6b shaft, 6c head, 7 bearing, 7a outer ring, 7b inner ring, 8 permanent magnet, 8a surface, 9 permanent magnet, 9a upper surface, 9b lower surface, 10 main base, 10-1 opening, 10-2 lower surface, 10a hole, 10aa, 10ab, 10ac recessed portion, 10ad mounting surface, 10ae screw hole, 10b hole, 10c contact surface, 10d bearing holder, 10da lower portion, 10db upper portion, 10dc inner peripheral surface, 10e leaf-spring mounting surface, 10f screw hole, 10g substrate positioning pin, 10g1 base, 10h tip, 10i stepped portion, 10j substrate positioning pin, 10j1 base, 10k tip, 10l stepped portion, 10m pillar, 10p upper end surface, 10q pillar, 10r upper end surface, 10s pillar, 10t upper end surface, 10u, 10v, 10w screw hole, 1 leaf spring, 11a sliding portion, 11b mounting portion, 11c hole, 11d base, 12 screw, 13 substrate mounting screw, 14 screw, 15 case, 15-1 top portion, 15A first side portion, 15B second side portion, 15C third side portion, 15D fourth side portion, 15a, 15b, 15c tab, 15d hole, 15e, 15f, 15g recessed portion, 15h connector case, 15i opening, 16 mounted screw, 20-1 lower surface, 20-2 upper surface, 20a, 20b positioning hole, 20c, 20d, 20e hole, 21 microcomputer, 21b table processing unit, 21c rotation-amount determining unit, 21e output unit, 21p, 21q rotation-angle acquiring unit, 22 bidirectional driver, 23 line driver, 24 connector, 40 magnetic sensor, 40a surface, 50 magnetic sensor, 50a surface, 60 base, 70 wall, 71 wall, 72 wall, 73 side surface, 80 wall, 100 absolute encoder, 200 motor, 201 motor shaft, 202 housing, 202a cut-out portion, 301 first side, 302 second side, 303 third side, 304 fourth side, 400 connector, Td axial direction of each of intermediate gear 2 and shaft 4, D diameter of worm wheel 2a, H axial height of worm gear 1d.

The invention claimed is:

1. An absolute encoder comprising:
   a first drive gear configured to rotate in accordance with rotation of a main spindle;
   a first driven gear that engages with the first drive gear;
   a second drive gear provided coaxially with the first driven gear and configured to rotate in accordance with rotation of the first driven gear;
   a second driven gear provided, in a plan view, on a side opposite the first drive gear with respect to the first driven gear and the second drive gear, the second driven gear engaging with the second drive gear;
   a rotating body configured to rotate in accordance with rotation of the second driven gear; and
   an angular sensor configured to detect a rotation angle of the rotating body,
   wherein the main spindle and the first driven gear are each disposed on an opposite side, of a same axis of the first driven gear and the second drive gear, from the second driven gear and the rotating body.

2. The absolute encoder according to claim 1, further comprising a main spindle angular sensor configured to detect a rotation angle of the main spindle.

3. The absolute encoder according to claim 1, wherein the first drive gear is a worm gear,
   wherein the first driven gear is a worm wheel, and
   wherein an outer diameter of the first driven gear is smaller than an outer diameter of the first drive gear.

4. The absolute encoder according to claim 1, wherein a diameter of the first driven gear is less than or equal to an axial height of the first drive gear.

5. The absolute encoder according to claim 1, further comprising a main base including a holding portion that holds the first driven gear and the second drive gear on a surface of a plate,
   wherein an axial direction of each of the first driven gear and the second drive gear is perpendicular to a thickness direction of the plate, and
   wherein an axial direction of the first drive gear and the second driven gear is perpendicular to the axial direction of each of the first driven gear and the second drive gear.

6. The absolute encoder according to claim 5, wherein the holding portion is provided on the surface of the plate and is integral with the plate.

7. The absolute encoder according to claim 5, wherein the plate is rectangular in the plan view, and
   wherein the axis of the first driven gear and the second drive gear extends obliquely with respect to each of four sides of the plate.

8. The absolute encoder according to claim 5, further comprising an elastic member configured to apply a preloading force to the first driven gear and the second drive gear, the preloading force being greater than a force to act, in the axial direction of the first driven gear and the second drive gear, against each of the first driven gear and the second drive gear in accordance with the rotation of a given gear among the first drive gear and the second driven gear, and the preloading force being toward an opposite direction of the force to act in the axial direction.

9. The absolute encoder according to claim 8, wherein the holding portion includes a securing portion to which the elastic member is secured.

10. The absolute encoder according to claim 5, further comprising a substrate with a substrate surface facing the plate, the angular sensor and a main spindle angular sensor, which is configured to detect a rotation angle of the main spindle, being provided on the substrate surface; and
   multiple pillars integrally provided with the plate, each pillar extending from the plate toward the substrate, and the substrate being supported at a tip of each pillar.

* * * * *